US005585852A

United States Patent [19]
Agarwal

[11] Patent Number: 5,585,852
[45] Date of Patent: Dec. 17, 1996

[54] PROCESSING VIDEO SIGNALS FOR SCALABLE VIDEO PLAYBACK USING INDEPENDENTLY ENCODED COMPONENT-PLANE BANDS

[75] Inventor: Rohit Agarwal, Hillsboro, Oreg.

[73] Assignee: Intel Corporation, Santa Clara, Calif.

[21] Appl. No.: 425,086

[22] Filed: Apr. 19, 1995

Related U.S. Application Data

[63] Continuation-in-part of Ser. No. 267,161, Jun. 28, 1994, Pat. No. 5,491,513, which is a continuation of Ser. No. 119,438, Sep. 9, 1993, Pat. No. 5,440,346, which is a continuation-in-part of Ser. No. 78,931, Jun. 16, 1993, Pat. No. 5,351,085.

[51] Int. Cl.$^6$ ............................................. H04N 7/26
[52] U.S. Cl. ............................. 348/398; 348/437
[58] Field of Search ........................... 348/397, 398, 348/437, 438, 407, 400, 416; H04N 7/26, 7/13

[56] References Cited

U.S. PATENT DOCUMENTS

| | | | |
|---|---|---|---|
| 5,235,420 | 8/1993 | Gharavi | 348/400 |
| 5,253,058 | 10/1993 | Gharavi . | |
| 5,276,525 | 1/1994 | Gharavi | 348/398 |
| 5,351,095 | 9/1994 | Kerdranvat | 348/407 |
| 5,414,469 | 5/1995 | Gonzales et al. | 348/416 |
| 5,446,495 | 8/1995 | Tourtier et al. | 348/395 |

OTHER PUBLICATIONS

"Sub–Band Coding of Monochrome and Color Images," by Hamid Gharavi and Ali Tabatabai, IEEE Transactions on Circuits and Systems, vol. 35, No. 2, Feb. 1988, pp. 207–214.

"Subband Coding of Images," by John W. Woods and Sean D. O'Neil, IEEE Transaction on Acoustics, Speech, and Signal Processing, vol. ASSP–34, No. 5, Oct. 1986, pp. 1278–1288.

"Sub–band Coding of Digital Images Using Two–Dimensional Quadrature Mirror Filtering," by H. Gharavi and Ali Tabatabai, SPIE vol. 707 Visual Communications and Image Processing (1986)/ISBN 0–89252–742–0; pp. 51–61.

"Sub–Band Coding of Images," by John W. Woods and Sean D. O'Neil, Proceedings ICASSP 86, Tokyo, Japan, Apr. 1986, pp. 1005–1008.

"Application of Quadrature Mirror Filtering to the Coding of Monochrome and Color Images," by H. Gharavi and A. Tabatabai, Proceedings ICASSP 87 on Acoustics, Speech, and Signal Processing, Apr. 6–9, 1987; pp. 2384–2387.

*Primary Examiner*—Victor R. Kostak
*Attorney, Agent, or Firm*—Steve Mendelsohn; William H. Murray

[57] ABSTRACT

An encoded bitstream is generated for playback scalability in terms of both bitrate scalability and decode scalability. During encoding, at least one component plane of each video frame is transformed into two or more bands of data. Each band is then encoded independent of the other bands and the resulting encoded bands are embedded in an encoded bitstream. At least one band sequence is encoded using interframe encoding.

66 Claims, 16 Drawing Sheets

PROCESSING VIDEO SIGNALS FOR SCALABLE VIDEO PLAYBACK USING INDEPENDENTLY ENCODED COMPONENT-PLANE BANDS

CROSS-REFERENCES TO RELATED APPLICATIONS

This is a continuation-in-part of application Ser. No. 08/267,161, now issued as U.S. Pat. No. 5,491,513, filed on Jun. 28, 1994 as attorney docket no. 366403-831, which is a continuation of application Ser. No. 08/119,438, now issued as U.S. Pat. No. 5,440,346, filed on Sep. 9, 1993 as attorney docket no. 366403-772, which is a continuation-in-part of application Ser. No. 08/078,931, now issued as U.S. Pat. No. 5,351,085, filed on Jun. 16, 1993 as attorney docket no. 366403-756. The '161 application is incorporated herein by reference in its entirety.

BACKGROUND OF THE INVENTION

1. Field of the Invention

The present invention relates to image processing, and, in particular, to computer-implemented processes and apparatuses for encoding and/or decoding video signals for storage, transmission, and/or playback.

2. Description of the Related Art

Most known video codec (i.e., coder/decoder) architectures are designed to generate compressed video for real-time playback in a limited class of processing environments. If the video codec is designed for a playback system with relatively low processing capabilities (e.g., a low-end personal computer (PC) system), then decoding the compressed video on a playback system with greater processing capabilities (e.g., a high-end PC system) will not provide significant performance advantages. If, on the other hand, the video codec is designed for a high-end PC system, then the quality of the playback output must be degraded in order to decode the compressed video on a low-end PC system.

In many known video codecs, the only mechanism for degrading the video quality during playback is the dropping of frames. If the video codec includes interframe encoding, then, in order to allow for the dropping of frames, some of the frames must be encoded as disposable frames (i.e., those that may be dropped without affecting the decoding of subsequent frames). The inclusion of such disposable frames tends to increase the size of the compressed bitstream. In addition, dropping frames results in jerky and unnatural video motion which can be disturbing to the viewer.

It is desirable, therefore, to provide a video codec that provides playback of compressed video in a variety of processing environments in which frames are not dropped when playback is performed on low-end systems.

To address the problem of decoding encoded video bitstreams in environments with limited transmission bandwidth (e.g., in certain video server and video conferencing applications), video codecs have been designed to generate embedded bitstreams. An embedded video bitstream contains two or more sub-bitstreams. For example, an embedded video bitstream may be generated by applying a transform (e.g., a wavelet transform) to at least one of the component planes of each frame of an input video stream to transform the component plane into two or more bands of data. Each band of each frame is compressed and encoded into the bitstream. Each encoded band sequence forms a sub-bitstream of the embedded bitstream.

The embedded bitstream is said to be interleaved, because all of the encoded bands for each frame are grouped together in the bitstream. That is, if each frame is transformed into n different bands, then the n encoded bands for frame i are grouped together in the embedded bitstream before any of the encoded bands for frame i+1.

In order to play back an embedded video bitstream, all of the encoded bands or only a subset of the encoded bands for each frame needs to be transmitted to the decoder. Such an embedded video bitstream can be played back in environments with different transmission bandwidth. For example, a system with a relatively high transmission bandwidth may be able to play back all of the encoded bands for each frame during real-time playback, while a system with a relatively low transmission bandwidth may only be able to play back a subset of the encoded bands for each frame. Since the low-transmission bandwidth system is not playing back all of the encoded data for the video stream, the resulting video images are typically of lower quality compared to those played back on the high-transmission bandwidth system. However, the frame rate (i.e., the number of flames displayed per second) for the low-transmission bandwidth system will be the same as that for the high-transmission bandwidth system.

Thus, by using an embedded video bitstream, the compressed video may be played back on a low-transmission bandwidth system without affecting the frame rate. The resulting video images will typically be more coarse (i.e., lower quality), but the desired frame rate will be maintained. This capability to play back the same compressed video bitstream at the same frame rate on systems with different transmission bandwidths is called bitrate scalability.

Bitrate scalability has been used in the past.

One known video codec that generates an embedded bitstream for bitrate scalability is based on the wavelet transform. Those skilled in the art will understand that a wavelet transform is a type of transform that generates two or more bands (i.e., sets of data) when applied to a component plane of a video frame. Under this video codec, there is no interframe encoding. That is, each frame is a key frame that is encoded without reference to any other frame. Each band of each frame is encoded and embedded into the bitstream in an interleaved fashion. Bitrate scalability is achieved by dropping one or more of the encoded bands during playback processing. A disadvantage of this known video codec is that it does not support interframe encoding which typically decreases the size of the encoded bitstream.

Another known video codec that generates an embedded bitstream for bitrate scalability falls under the MPEG-II standard. Under this video codec, motion estimation and motion compensation are applied to the component planes and interframe differences are generated. A transform (e.g., the discrete cosine transform (DCT)) is then applied to each block of the interframe differences to generate transformed data (e.g., DCT coefficients).

To generate an embedded bitstream, the transformed data are divided into two parts, which are encoded and embedded into the bitstream in an interleaved fashion. In one embodiment, the first part of the transformed data corresponds to the most significant bits (MSBs) of each DCT coefficient of each block, while the second part corresponds to the least significant bits (LSBs) of the DCT coefficients. In another embodiment, the first part corresponds to the low-frequency DCT coefficients of each block, while the second part corresponds to the high-frequency DCT coefficients.

In either embodiment, the first part of the transformed data for each block is encoded for all of the blocks of the frame. The encoded first part forms the first portion of the embedded bitstream for that frame. The second portion of the embedded bitstream for the frame is generated by decoding the encoded first portion (e.g., using the inverse DCT transform). The resulting decoded signals are then subtracted from the original set of interframe differences to generate a second set of differences. This second set of differences is then encoded (e.g., by applying the DCT transform) to generate the second portion of the embedded bitstream.

Under this MPEG-II codec scheme, a system can achieve bitrate scalability by throwing away the second portion of the embedded bitstream during playback. To ensure that any system (high-transmission bandwidth or low-transmission bandwidth) can properly play back the compressed video bitstream, the encoder must use, as its reference for interframe differencing, a coarse image based only on the first portion of the embedded bitstream. As a result, a high-transmission bandwidth system must generate and maintain two decoded images for each frame: a coarse reference image based only on the first portion of the embedded bitstream and a fine display image based on the full embedded bitstream.

In addition to the disadvantage of having to maintain two decoded images, the encoding of the second potion typically results in a significant (about 30–40%) increase in bit rate. Under this MPEG-II scheme, a video codec that generated an embedded bitstream with more than two potions would typically have an even greater bit rate overhead.

While these systems provide some degree of bitrate scalability in a situation in which transmission bandwidth is limited, they provide negligible scalability in a situation in which decode processing bandwidth is limited. What is needed is a video codec architecture that provides playback sealability in terms of either transmission and/or processing without the disadvantages of the known systems.

It is therefore an object of the present invention to provide processes and apparatuses for encoding and/or decoding video signals to support video playback scalability without the disadvantages of the known systems.

In particular, it is an object of the present invention to provide a video codec that provides playback of compressed video in a variety of processing environments in which frames are not dropped when playback is performed on low-end systems.

Further objects and advantages of this invention will become apparent from the detailed description of a preferred embodiment which follows.

SUMMARY OF THE INVENTION

The present invention comprises a computer-implemented process and apparatus for encoding video signals. According to a preferred embodiment, a transform is applied to at least one component plane of each frame of a video stream to generate a transformed video stream comprising a plurality of bands for each frame, wherein the transformed video stream comprises a plurality of band sequences, each band sequence comprising corresponding bands of different frames. Each band sequence is encoded independent of each other band sequence to generate an embedded bitstream, wherein interframe encoding is performed on at least one of the plurality of band sequences.

The present invention also comprises a computer-implemented process and apparatus for decoding encoded video signals. According to a preferred embodiment, an embedded bitstream is parsed into a plurality of encoded band sequences, wherein each encoded band sequence has been generated by encoding each band sequence of a plurality of band sequences of a transformed video stream, the transformed video stream having been generated by applying a transform to at least one component plane of each frame of an original video stream to generate a plurality of bands for each frame. Each encoded band sequence is decoded independent of each other encoded band sequence to generate a decoded video stream, wherein interframe decoding is performed on at least one of the plurality of encoded band sequences.

BRIEF DESCRIPTION OF THE DRAWINGS

Other objects, features, and advantages of the present invention will become more fully apparent from the following detailed description of preferred embodiment(s), the appended claims, and the accompanying drawings in which:

DESCRIPTION OF PREFERRED EMBODIMENT(S)

The present invention is directed to codecs for encoding and decoding video data to provide playback scalability without affecting playback frame rate. According to one possible embodiment, the video codec applies a forward wavelet transform to the Y-component plane of each frame to generate four bands of transformed Y data. Motion-compensated block-based interframe encoding is then applied to each of the six individual bands per frame, where the U- and V-component planes are each treated as a band.

In this way, each band sequence is encoded independent of each other band sequence to provide an embedded encoded bitstream. The embedded bitstream can be played back in a scalable fashion in a variety of processing environments having different transmission and/or processing bandwidths by selectively dropping one or more encoded band sequences. The different levels of scalable playback produce different levels of image quality, while maintaining the same frame rate.

System Hardware Architectures

Figure 1:
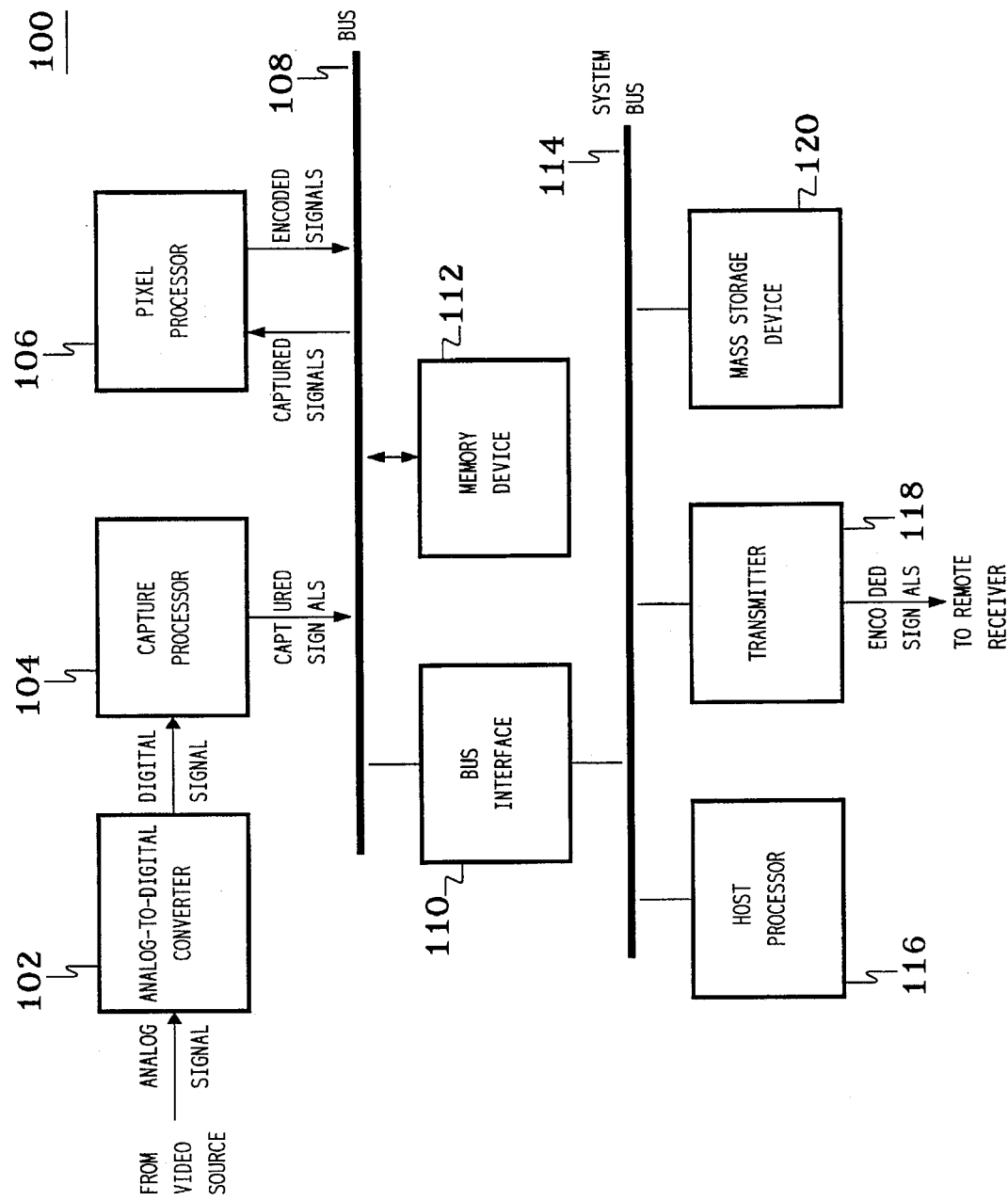
FIG. 1 is a block diagram of a video system for processing video signals in a PC environment, according to one embodiment of the present invention.

Referring now to FIG. 1, there is shown a computer system 100 for encoding video signals, according to one embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in one embodiment, Y, U, and V component signals).

Capture processor 104 receives, captures, and stores the digitized component signals as subsampled video frames in memory device 112 via bus 108. Each subsampled video frame is represented by a set of two-dimensional component planes, one for each component of the digitized video signals. In one embodiment, capture processor 104 captures video signals in a YUV9 format, in which every (4×4) block of pixels of the Y-component plane corresponds to a single pixel in the U-component plane and a single pixel in the V-component plane.

Pixel processor 106 accesses the captured bitmaps from memory device 112 via bus 108 and generates encoded video signals that represent the captured video signals. Depending upon the particular encoding scheme implemented, pixel processor 106 applies a sequence of compression steps to reduce the amount of data used to represent in the information in the video signals. The encoded video signals may then be stored to memory device 112 via bus 108 for eventual transmission to host processor 116 via bus 108, bus interface 110, and system bus 114.

Host processor 116 may transmit the encoded video signals to transmitter 118 for real-time transmission to a remote receiver (not shown in FIG. 1), store the encoded video signals to mass storage device 120 for future processing, or both.

In an alternative embodiment of encoding system 100, the video encoding processing is implemented on the host processor 116. In this alternative embodiment, there is no pixel processor 106 and the captured signals are transmitted from memory device 112 to the host processor 116 via bus interface 110 for compression.

Figure 2:
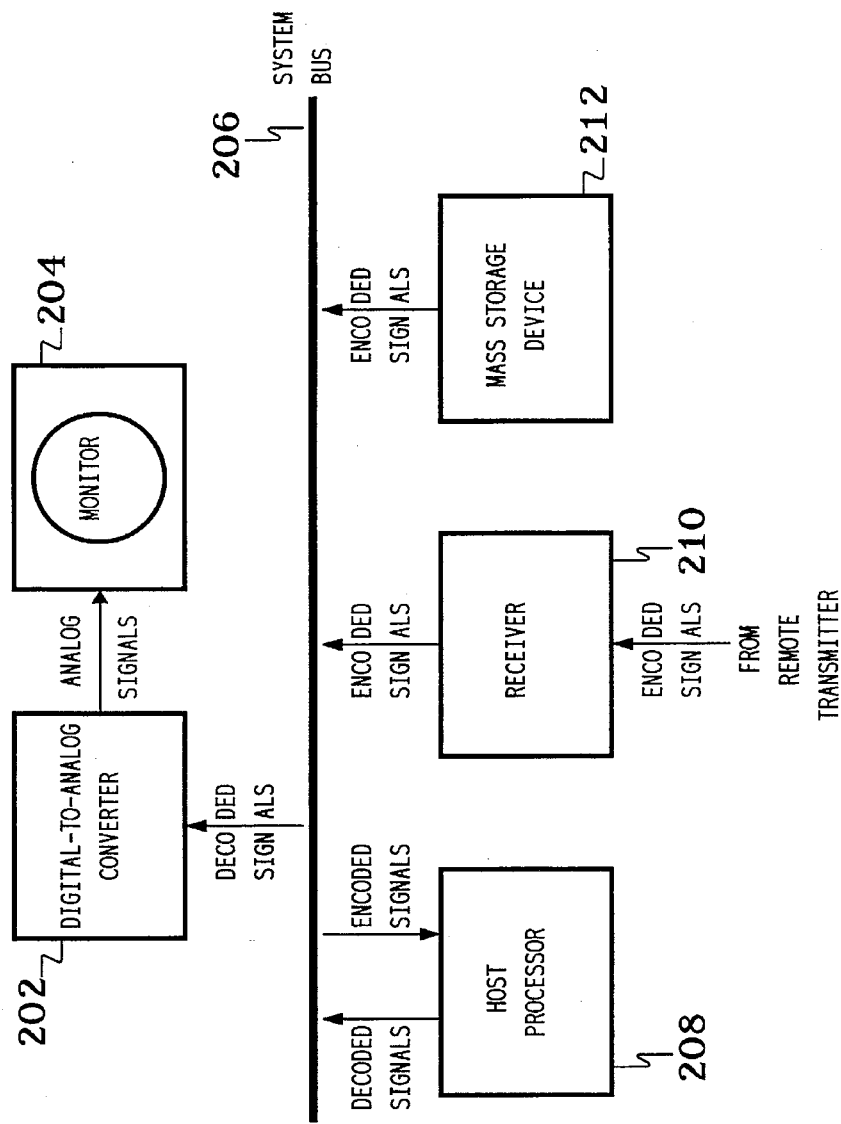
FIG. 2 is a computer system for decoding the video signals encoded by the computer system of FIG. 1, according to one embodiment of the present invention.

Referring now the FIG. 2, there is shown a computer system 200 for decoding the video signals encoded by encoding system 100 of FIG. 1, according to one embodiment of the present invention. Host processor 208 of decoding system 200 receives encoded video signals via system bus 206 that were either read from mass storage device 212 or received by receiver 210 from a remote transmitter, such as transmitter 118 of FIG. 1.

Host processor 208 decodes the encoded video signals and scales the decoded video signals for display. Decoding the encoded video signals involves undoing the compression processing implemented by encoding system 100 of FIG. 1. For YUV9 data, scaling the decoded video signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the video signals as original captured. Host processor 108 then transmits the scaled video signals to digital-to-analog (D/A) converter 202 via system bus 206. D/A converter converts the digital scaled video signals to analog video signals for display on monitor 204.

Referring again to FIG. 1, encoding system 100 is preferably a microprocessor-based personal computer (PC) system with a special purpose video-processing plug-in board. In particular, A/D converter 102 may be any suitable memos for decoding and digitizing analog video signals. Capture processor 104 may be any suitable processor for capturing digitized video component signals as subsampled frames. Pixel processor 106 may be any suitable means for encoding subsampled video signals and is preferably an Intel® i750™ pixel processor. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia-II® board, capable of being added to a microprocessor-based PC system.

Host processor 116 may be any suitable means for controlling the operations of the special-purpose video processing board and is preferably an Intel® general-purpose microprocessor such as an Intel® i486™, Pentium™, or higher processor. System bus 114 may be any suitable digital signal transfer device and is preferably an ISA or EISA bus. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or wide area network.

Referring now to FIG. 2, decoding system 200 is preferably a microprocessor-based PC system similar to the basic PC system of encoding system 100. In particular, host processor 208 may be any suitable means for decoding and scaling encoded video signals and is preferably an Intel® general purpose microprocessor such as an Intel® i486™, Pentium™, or higher processor. In an alternative preferred embodiment, decoding system 200 may also have a pixel processor similar to pixel processor 106 of FIG. 1 for decoding the encoded video signals and a display processor such as an Intel® i750™ display processor for scaling the decoded video signals.

System bus 206 may be any suitable digital signal transfer device and is preferably an ISA or EISA bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for convening digital video signals to analog video signals and is preferably implemented through a PC-based display system such as a VGA or SVGA system. Monitor 204 may be any means for displaying analog signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video signals. Those skilled in the an will understand that such a combined system may be used to display decoded video signals in real-time to monitor the capture and encoding of video signals.

Encode Processing

Figure 3:
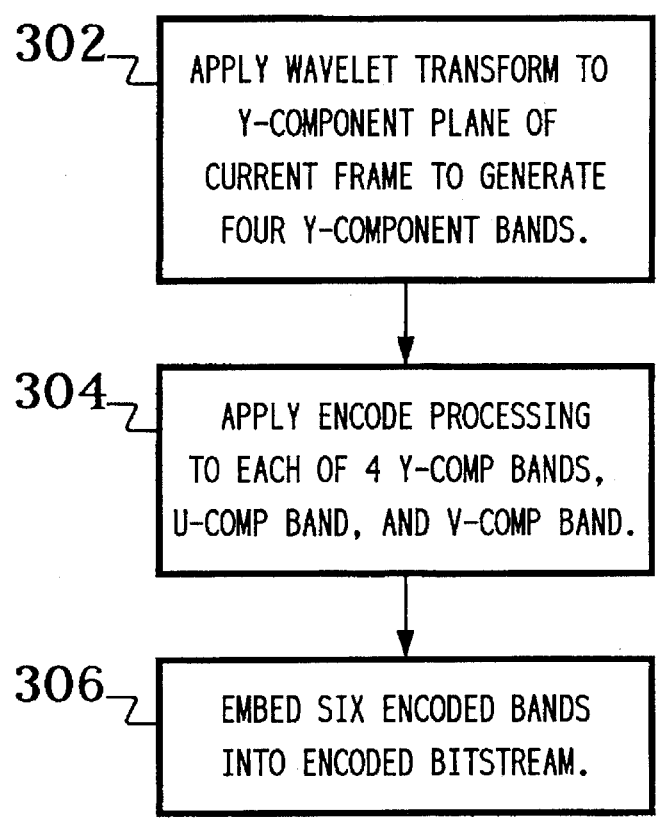
FIG. 3 is a process flow diagram of the compression processing implemented by the system of FIG. 1 for each frame of a video stream.
Figure 4:
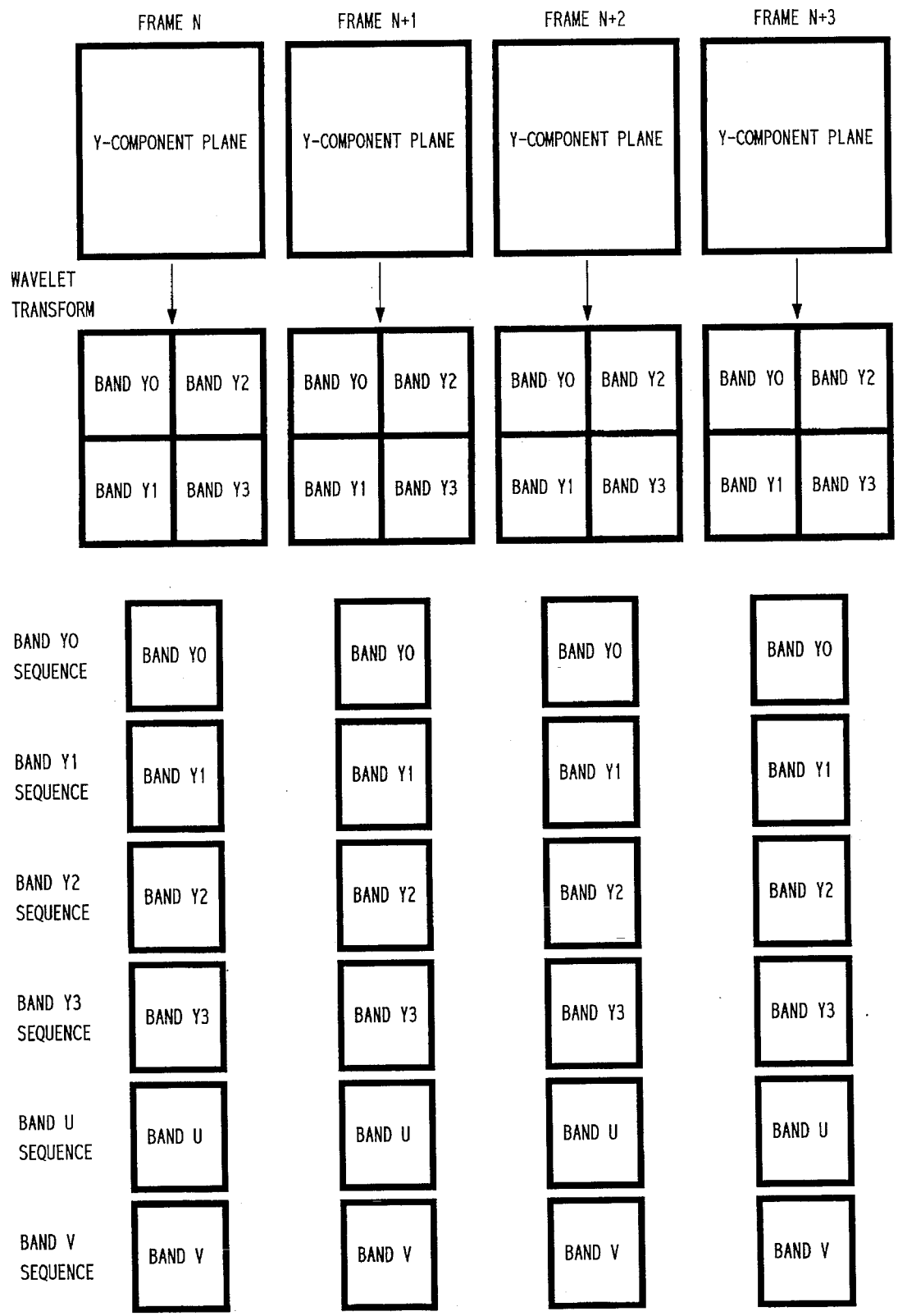
FIG. 4 shows a graphical representation of the six band sequences for the compression processing of FIG. 3.

Referring now to FIG. 3, there is shown a process flow diagram of the compression processing implemented by encode system 100 of FIG. 1 for each frame of a video stream, according to a preferred embodiment of the present invention. In a preferred embodiment in which the video stream is captured in subsampled YUV9 video format, each frame comprises a Y-component plane, a subsampled U-component plane, and a subsampled V-component plane. A forward wavelet transform is applied to the Y-component plane to transform the Y-data into four separate bands of data, thereby producing a total of six bands of data for each frame: four Y-component bands, one U-component band, and one V-component band. Each band is then encoded as part of a distinct band sequence. FIG. 4 shows a graphical representation of the six band sequences.

Compression processing for each frame begins by applying a forward wavelet transform to the Y-component plane to generate four bands of Y-component data (step 302 of FIG. 3). For purposes of this specification, these four Y-component bands are designated Band Y0, Band Y1, Band Y2, and Band Y3. The subsampled U-component plane (which is not wavelet transformed) is designated Band U, and the subsampled V-component plane (which is also not wavelet transformed) is designated Band V. The preferred forward wavelet transform is described in greater detail later in this specification in the section entitled "Wavelet Transform."

Encode processing (of FIG. 5) is then applied to each of the six bands of the current frame (step 304), where each band is pan of a distinct band sequence (see FIG. 4). The encoded bands are then embedded into the compressed video bitstream to complete the compression processing for the current frame (step 306). Steps 302–306 of FIG. 3 are repeated for each frame of the video stream.

Figure 15:
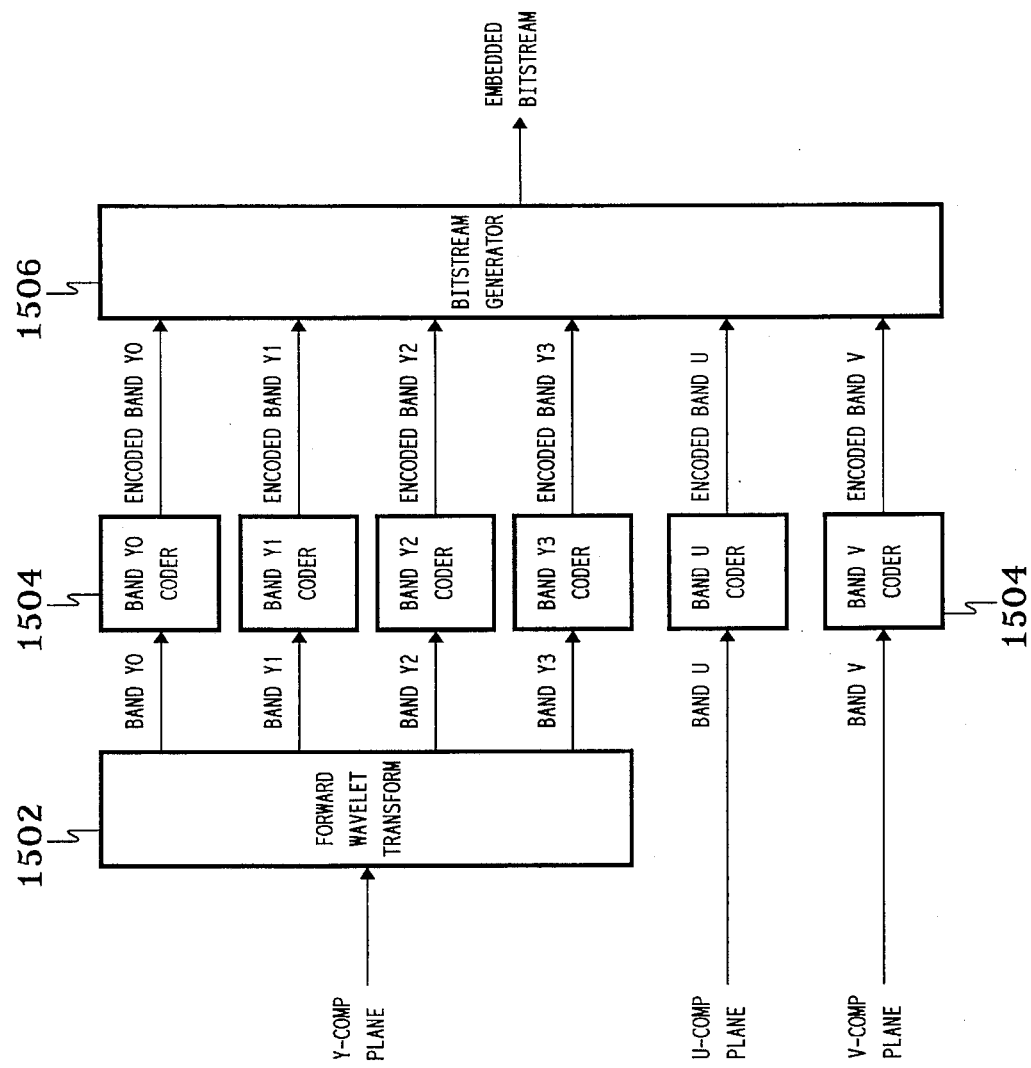
FIG. 15 is a block diagram of an encoder that implements the compression processing of FIG. 3.

Referring now to FIG. 15, there is shown a block diagram of an encoder that implements the compression processing of FIG. 3. Forward wavelet transform 1502 applies the preferred forward wavelet transform to the Y-component plane of each frame. Coders 1504 encode the six bands of data and bitstream generator 1506 embeds the resulting encoded bands into the encoded video bitstream.

Figure 5:
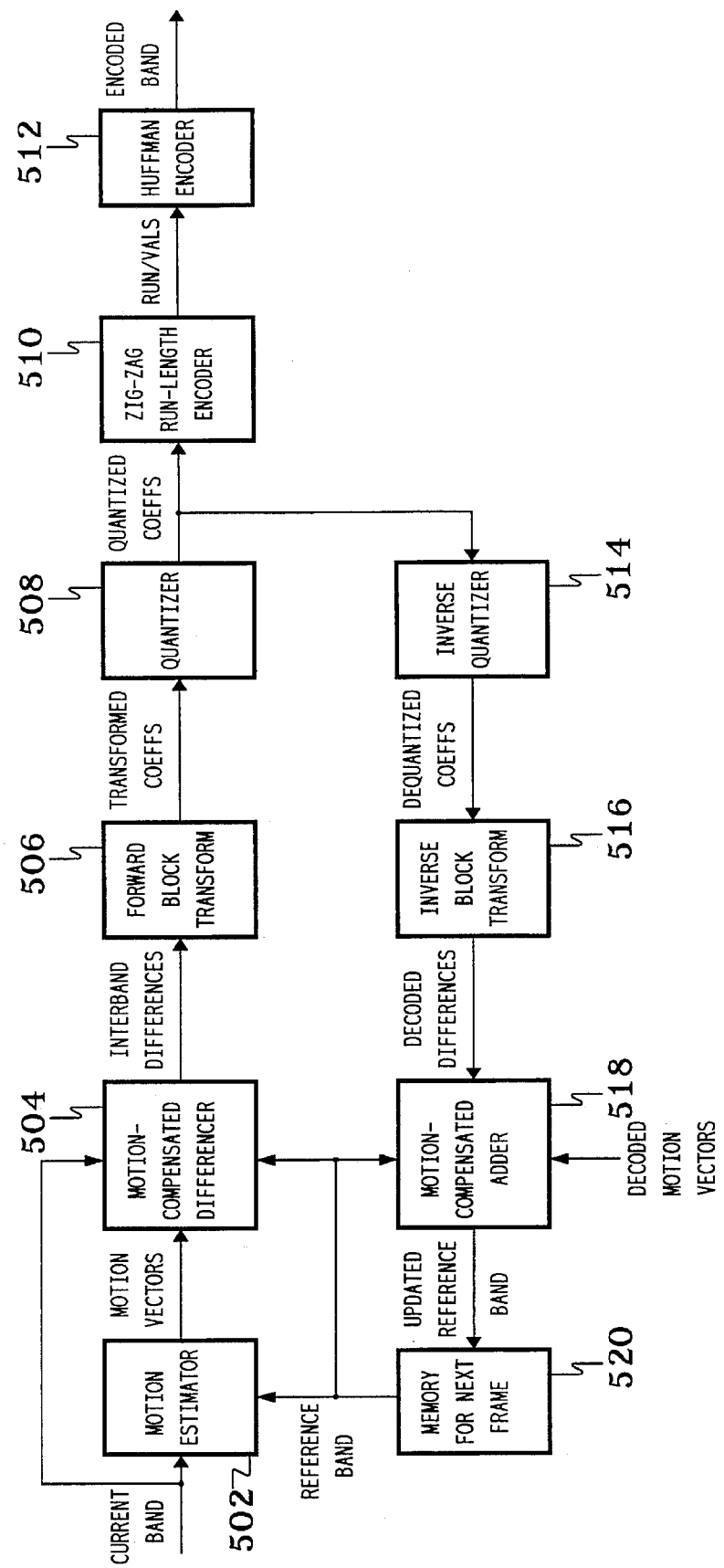
FIG. 5 is a block diagram of the encode processing of FIG. 3 which is applied to each band of each frame of the video stream that is interframe encoded.

Referring now to FIG. 5, there is shown a block diagram of the encode processing of step 304 of FIG. 3 which is applied to each band of each inter-encoded frame of the video stream, according to one embodiment of the present invention. Those skilled in the art will understand that, in a video codec that employs interframe encoding, some of the frames are inter-encoded as predicted (i.e., delta) frames, while others are intra-encoded as key frames. For example, every eighth frame may be a key frame. The encoding of key frames may be equivalent to the encoding of inter-encoded frames without the motion estimation and motion-compensated differencing.

For a band of an inter-encoded frame, motion estimator 502 of FIG. 5 performs motion estimation on blocks of the current band relative to a reference band to generate a set of motion vectors for the current band. Those skilled in the art will understand that the reference band is preferably the set of data generated by decoding the corresponding encoded band for the previous frame.

It will be further understood that the motion vectors are also encoded into the compressed video bitstream. The motion vectors are preferably encoded using spatial differencing, in which each motion vector is encoded based on its difference from the previous motion vector (i.e., the adjacent motion vector following a particular scan sequence). The motion vector spatial differences are then Huffman an encoded.

Motion-compensated differencer 504 applies the motion vectors to the reference band and generates interband differences for the current band using the motion-compensated reference band and the current band.

A forward block transform 506 is then applied to each block of the interband differences to generate transformed coefficients for the current band. In one embodiment, transform 506 is a two-dimensional slant transform. In alternative embodiments, transform 506 may be a different transform such as, but not limited to, a one-dimensional slant transform, a one- or two-dimensional Haar transform, a DCT transform, or a hybrid transform.

Quantizer 508 quantizes the transformed coefficients to generate quantized coefficients for the current band. Quantizer 508 applies uniform scalar quantization, wherein each coefficient is divided by a specified integer scale factor.

Zig-zag run-length encoder 510 transforms the quantized coefficients into run-length encoded (RLE) data. In a preferred embodiment, the RLE data for each block of quantized coefficients consist of a sequence of run/val pairs, where each run/val pair is a non-zero quantized coefficient value followed by a value corresponding to a run of zero quantized coefficients. The run-length encoding follows a zig-zag pattern from the upper-left corner of the block of quantized coefficients (i.e., the DC coefficient of the slant transform) to the lower-right corner (:i.e., the highest frequency coefficient of the slant transform). Those skilled in the art will understand that using the zig-zag pattern provides a long run of zero coefficients for the last run of the block.

Huffman encoder 512 applies Huffman-type entropy (i.e., statistical or variable-length) coding to the RLE data to generate the encoded data for the current band.

The encode processing of FIG. 5 also includes the decoding of the encoded band to update the reference band for use in encoding the corresponding band of the next video frame. Since the run-length and Huffman encoding are lossless encoding steps, the decode loop of the encode processing begins at inverse quantizer 514, which dequantizes the quantized coefficients to generate dequantized coefficients for the current band.

Inverse block transform 516 applies the inverse of forward block transform 506 to the dequantized coefficients to generate decoded differences for the current band. Motion-compensated adder 518 applies decoded motion vectors (generated by decoding the encoded motion vectors) to the reference band to perform interband addition using the motion-compensated reference band and the decoded differences to generate an updated reference band. The updated reference band is stored in memory 520 for use as the reference band in coding the corresponding band of the next video frame.

Decode Processing

Figure 6:
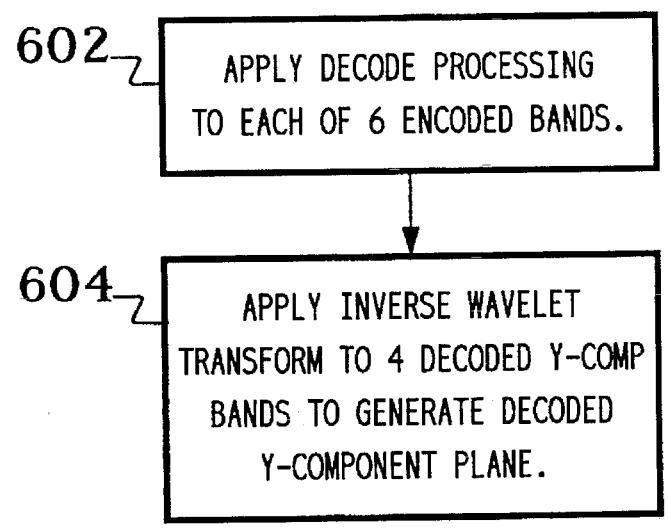
FIG. 6 is a process flow diagram of the decompression processing implemented by the decode system of FIG. 2 for each encoded frame of the encoded video bitstream.

Referring now to FIG. 6, there is shown a process flow diagram of the decompression processing implemented by decode system 200 of FIG. 2 for each encoded frame of the encoded video bitstream, according to a preferred embodiment of the present invention. For each encoded frame of the encoded video bitstream, decode processing (of FIG. 7) is applied to each of the six encoded bands (step 602 of FIG. 6). An inverse wavelet transform is then applied to the four decoded Y-component bands to generate the decoded Y-component plane (step 604). The decoded Y-component plane data are then processed with the decoded U- and V-component plane data to generate a decoded video image for display. The preferred inverse wavelet transform is described in greater detail later in this specification in the section entitled "Wavelet Transform."

Figure 16:
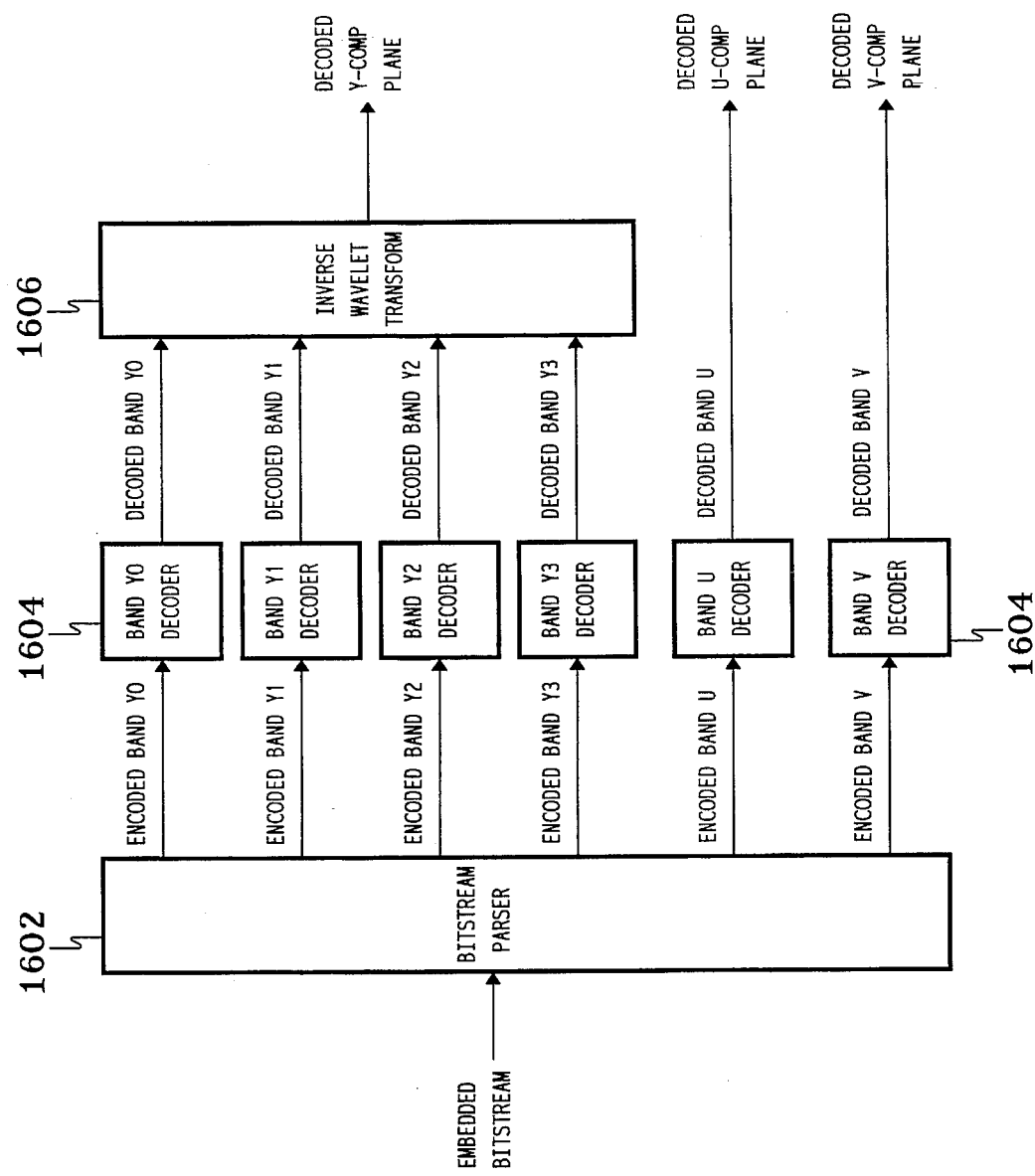
FIG. 16 is a block diagram of a decoder that implements the decompression processing of FIG. 6.

Referring now to FIG. 16, there is shown a block diagram of a decoder that implements the decompression processing of FIG. 6. Bitstream parser 1602 parses the embedded bitstream into the six encoded band sequences. Decoders 1604 decode the six bands of encoded data for each frame and inverse wavelet transform 1606 applies the preferred inverse wavelet transform to the decoded Y-component bands to generate the decoded Y-component plane.

Figure 7:
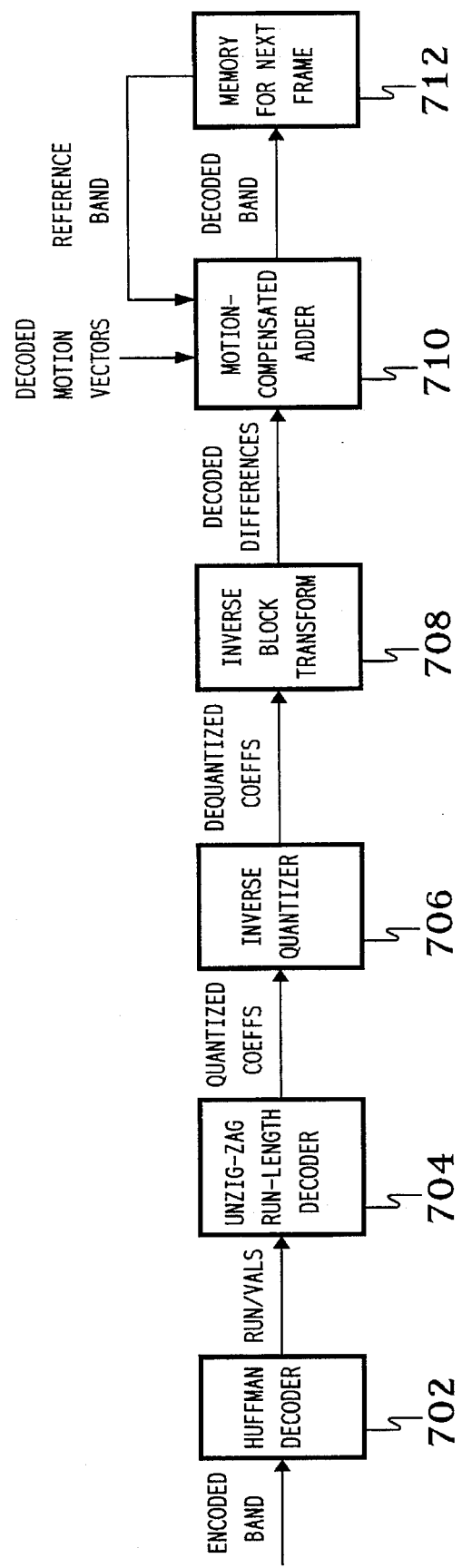
FIG. 7 is a block diagram of the decode processing of FIG. 6 that is applied to each encoded band of each interframe-encoded frame of the encoded video bitstream.

Referring now to FIG. 7, there is shown a block diagram of the decode processing of step 602 of FIG. 6 that is applied to each encoded band of each inter-encoded frame of the encoded video bitstream, according to one embodiment of the present invention. The decode processing of FIG. 7 reverses the encode processing of FIG. 5. In particular, Huffman decoder 702 applies Huffman-type entropy decoding to the encoded data for the current band to reconstruct the run-length encoded run/val data. Unzig-zag run-length decoder 704 transforms the RLE data into quantized coefficients. Inverse quantizer 706 dequantizes the quantized coefficients to generate dequantized coefficients. Inverse block transform 708 applies the inverse of forward block transform 506 to the dequantized coefficients to generate decoded differences.

Motion-compensated adder 710 applies the decoded motion vectors for the current band to the reference band, and performs inter-band addition using the motion-compensated reference band and the decoded differences to generate the decoded data for the current band. The decoded band is then stored in memory 712 for use as the reference band for decoding the corresponding band of the next video frame. If the decoded band corresponds to a Y-component band, the decoded band is also used to reconstruct the decoded Y-component plane (step 604 of FIG. 6). Otherwise, the decoded band is either the decoded U- or V-component plane. In any case, the decoded band is used to generate the decoded image for display.

Wavelet Transform

Figure 8:
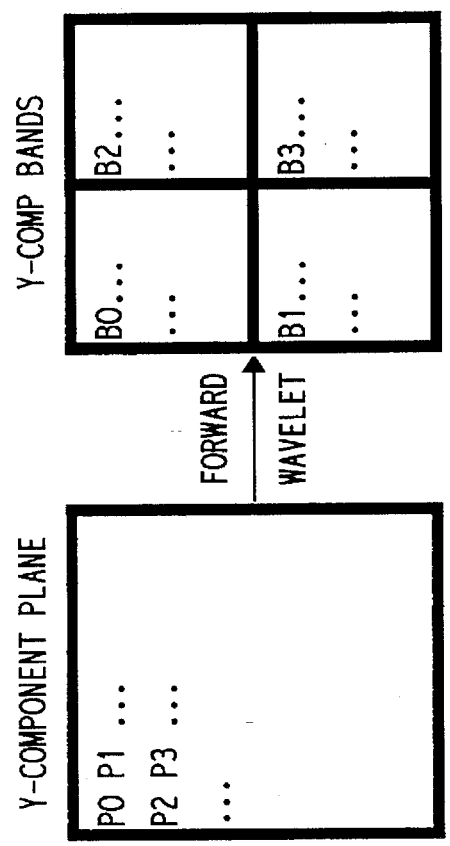
FIG. 8 is a graphical representation of a preferred forward wavelet transform applied to the Y-component plane of each video frame during the compression processing of FIG. 3.

Referring now to FIG. 8, there is shown a graphical representation of the preferred forward wavelet transform applied to the Y-component plane of each video frame during compression processing (step 302 of FIG. 3). This forward wavelet transform is defined by the following equations:

$$b0 = (p0+p1)+(p2+p3) \quad (1)$$
$$b1 = (p0+p1)-(p2+p3)$$
$$b2 = (p0-p1)+(p2-p3)$$
$$b3 = (p0-p1)-(p2-p3)$$

where p0, p1, p2, p3 are Y-component values of the original Y-component plane and b0, b1, b2, b3 are the transformed values for the four bands of transformed Y-component data.

Figure 9:
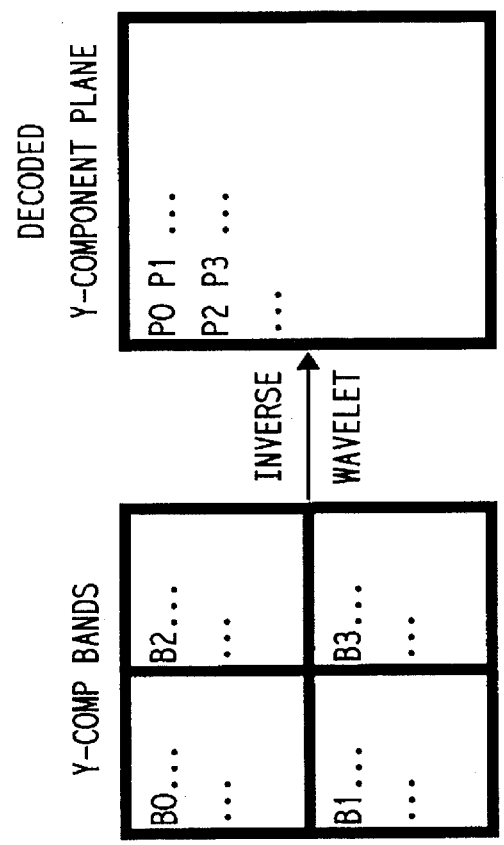
FIG. 9 is a graphical representation of a preferred inverse wavelet transform applied to the four decoded bands of Y-component data for each video frame during the decompression processing of FIG. 6.

Referring now to FIG. 9, there is shown a graphical representation of the preferred inverse wavelet transform applied to the four decoded bands of Y-component data for each video frame during decompression processing (step 604 of FIG. 6). This inverse wavelet transform is defined by the following equations:

$$p0 = [(b0+b1)+(b2+b3)+2]>>2 \quad (2)$$
$$p1 = [(b0+b1)-(b2+b3)+2]>>2$$
$$p2 = [(b0-b1)+(b2-b3)+2]>>2$$
$$p3 = [(b0-b1)-(b2-b3)+2]>>2$$

where b0, b1, b2, b3 are decoded Y-component band data and p0, p1, p2, p3 are the components of the decoded Y-component plane. The function ">>2" means "shift right two bits" and is equivalent to dividing a binary value by 4.

Video Playback Scalability

For purposes of this application, the phrase "independent of" is defined as follows. A first band sequence is said to be interframe encoded "independent of" a second band sequence, if the reference band used for interframe encoding of the first band sequence is not affected by the decoding of the encoded second band sequence. Similarly, an encoded first band sequence is said to be interframe decoded "independent of" an encoded second band sequence, if the reference band used for interframe decoding of the encoded first band sequence is not affected by the decoding of the encoded second band sequence. For encoding, the reference band is the set of data used to generate interband differences (see FIG. 5). For decoding, the reference band is the set of data to which the decoded differences are added (see FIG. 7).

In general, the present invention supports the encoding of each band sequence independent of all of the other band sequences of the video stream. As such, the reference bands used in decoding each band sequence are distinct from (i.e., not affected by) the decoding of all of the other band sequences. As a result, any one or more band sequences can be dropped without adversely affecting the decoding of the remaining band sequences. In this way, the present invention supports video playback scalability.

Under the present invention, video playback scalability can be exploited in, at least, two different ways: decode scalability and bitrate scalability. Decode scalability applies when a video decoding system, such as system 200 of FIG. 2, is unable to decode all of the encoded band sequences of the encoded bitstream while maintaining the frame rate at which the data was encoded. In such a case, the video decoding system only decodes a subset of the encoded band sequences (i.e., drops one or more of the encoded band sequences). Since not all of the encoded data is used to generate the decoded images for display, the image quality will be diminished, but the desired frame rate will be maintained.

Bitrate scalability applies when the transmission bandwidth of a video decoding system is sufficiently limited. For a system like decoding system 200 of FIG. 2, a transmission bottleneck could be related to the reading of encoded signals from mass storage device 212, the receipt of encoded signals by receiver 210 from remote transmitter, or transmission of the encoded signals over system bus 206. In any case, if there is insufficient bandwidth to transmit all of the encoded band sequences, one or more of them may be dropped (i.e., not transmitted). In this case, the decoder decodes only the transmitted portion of the bitstream. Here, too, the image quality of the video playback is diminished without affecting the displayed frame rate.

Those skilled in the art will understand that the selection of which encoded band sequences are dropped (for either transmission or decoding) can be fixed for a particular decoding environment or adaptively selected in real-time based the transmission or processing bandwidth that is currently available.

Those skilled in the art will also understand that the present invention provides the playback scalability benefit of wavelet transforms without having to sacrifice the use of motion estimation and motion compensation, which typically reduces the size of the compressed bitstream.

Referring now to FIGS. 11–14, there are shown graphical representations of five different cases of playback supported by the present invention. Those skilled in the art will understand that the Band Y0 data corresponds to the lowest frequency Y-component data generated by the preferred wavelet transform, while the Band Y3 data corresponds to the highest frequency Y-component data, with Band Y1 lower than Band Y2. Since the human eye is most sensitive to low-frequency visual data, the Band Y0 data is the most important Y-component data to decode, followed in order by the Band Y1, the Band Y2, and lastly the Band Y3 data. The five different cases shown in FIGS. 11–14 were designed to exploit these relationships. It will be understood that other cases are also possible.

Figure 10:
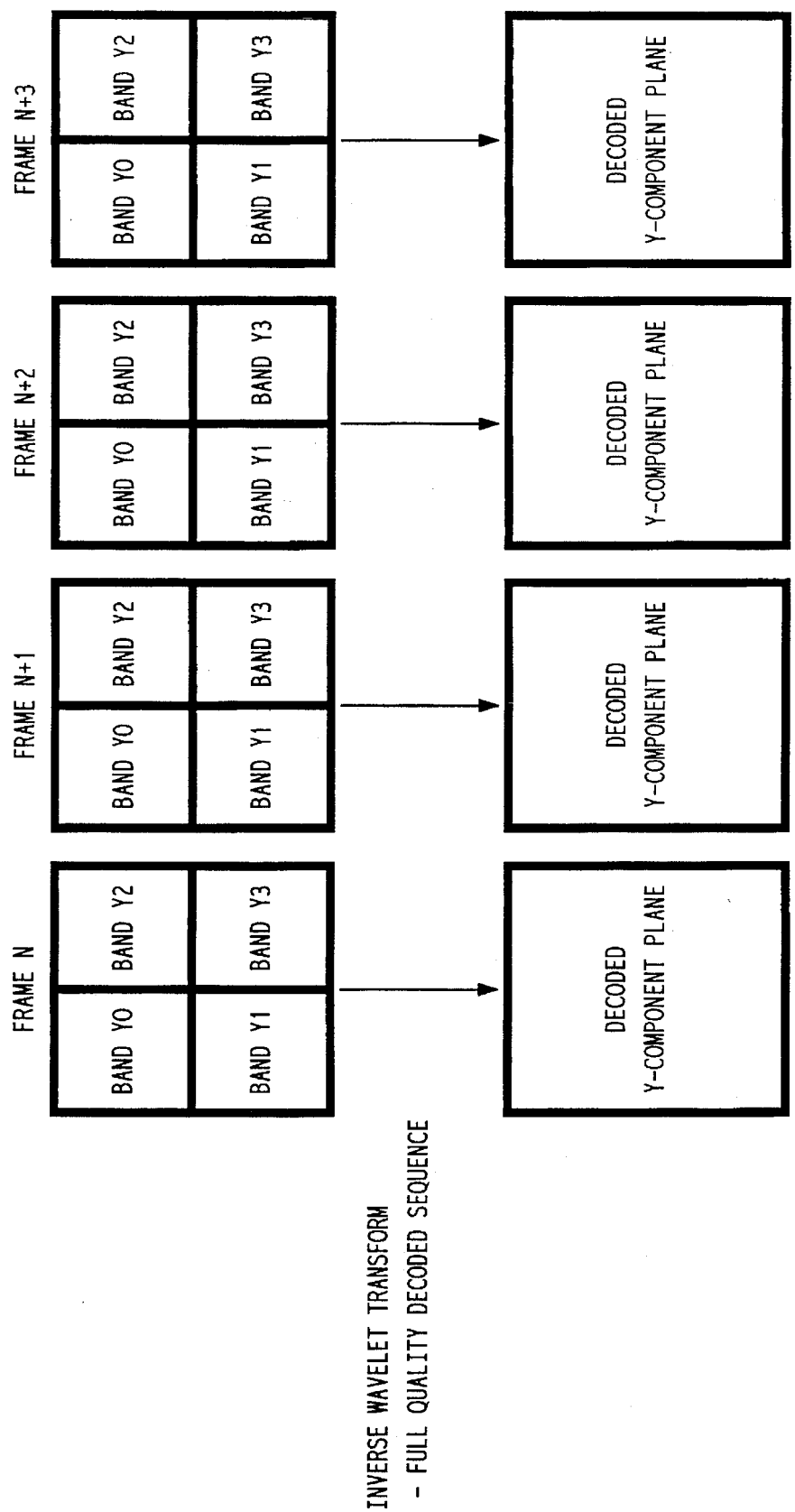

FIG. 10 shows Case 1 in which all four bands of Y-component data are decoded. In Case 1, the inverse wavelet transform of Equation (2) is applied.

Figure 11:
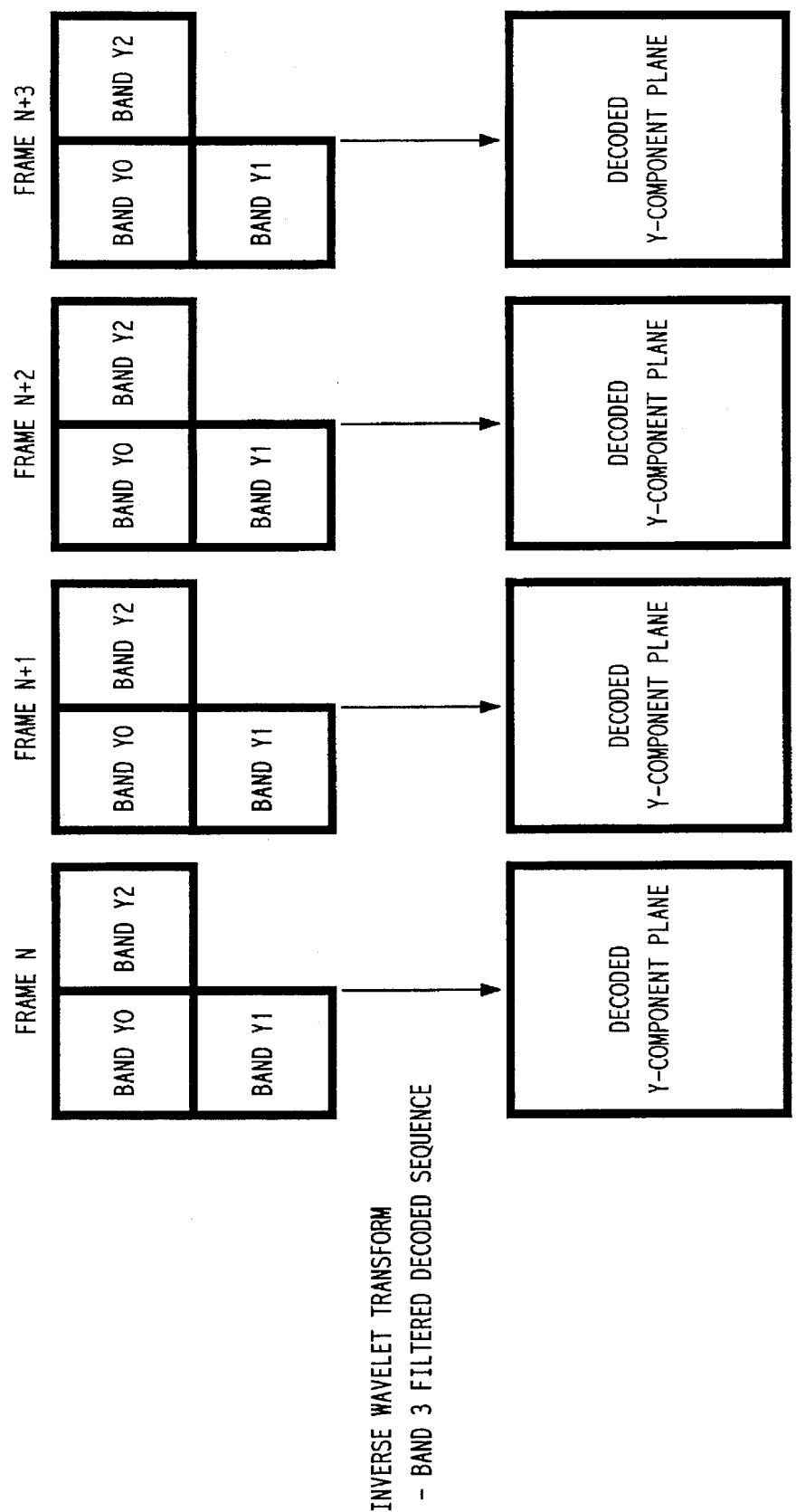
FIGS. 11–14 show graphical representations of five different cases of playback supported by the present invention.

FIG. 11 shows Case 2 in which Bands Y0, Y1, and Y2 are decoded (i.e., Band Y3 is dropped). In one possible implementation of Case 2, the decoded Y-component plane is constructed by applying the transform of Equation (2) in which each b3 value is set to zero. In another possible implementation, the Band Y2 data is interpolated vertically (i.e., an interpolated b2 value is generated below each b2 value in the vertical direction). The transform of Equation (2) is then applied with the interpolated b2 values used for the b3 values. In yet another possible implementation, the Band Y1 data is interpolated horizontally (i.e., an interpolated b1 value is generated to the right of each b1 value in the horizontal direction). The transform of Equation (2) is then applied with the interpolated b1 values used for the b3 values.

Figure 12:
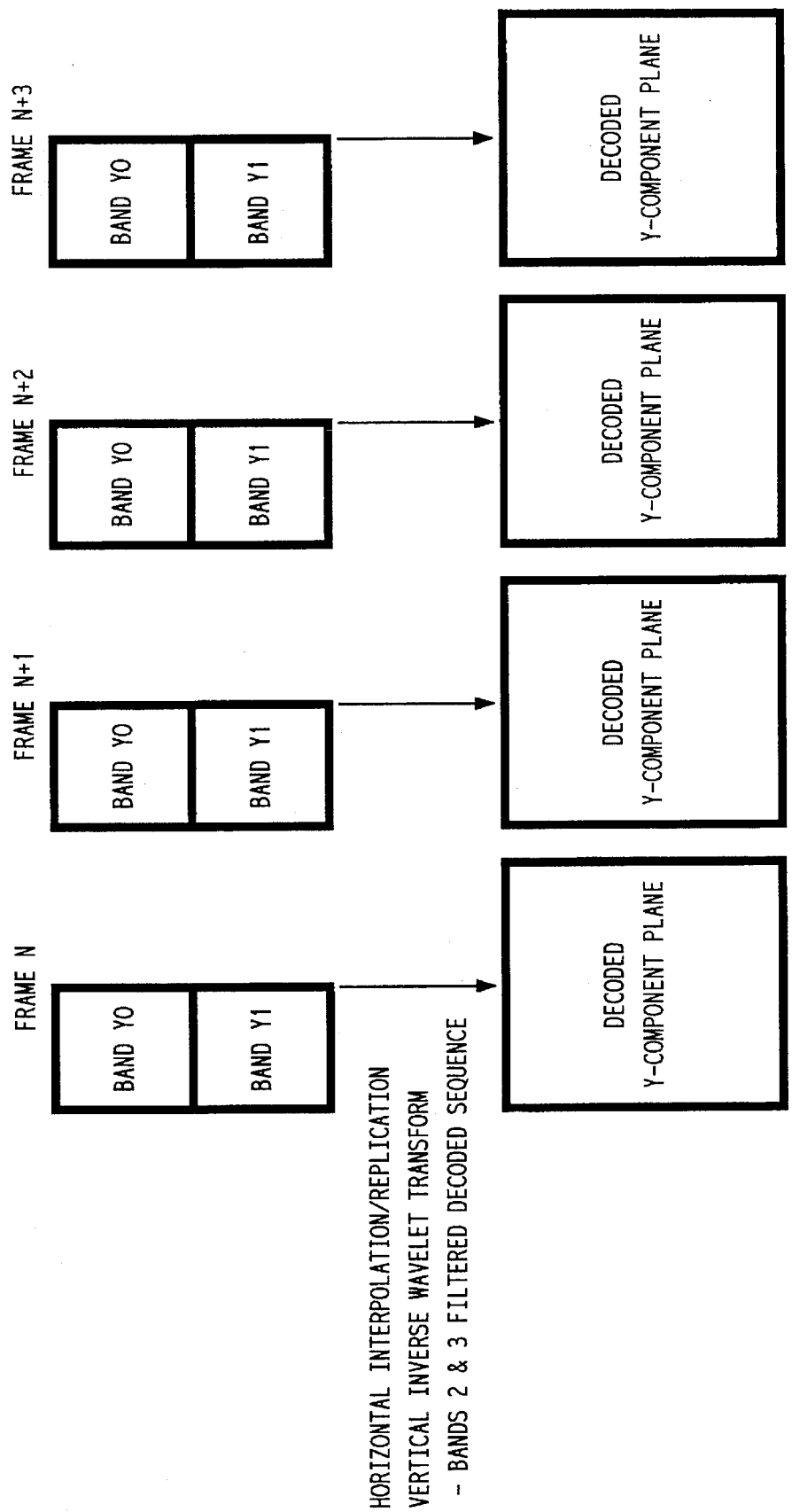

FIG. 12 shows Case 3 in which Bands Y0 and Y1 are decoded (i.e., Bands Y2 and Y3 are dropped). In Case 3, p0 and p2 are generated using the following Equation (3), derived from Equation (2) where b2 and b3 are both zero:

$$p0 = [(b0+b1)+2] >> 2 \quad (3)$$
$$p2 = [(b0-b1)+2] >> 2$$

In one possible implementation of Case 3, p1 and p3 are generated by horizontally replicating p0 and p2, respectively. In another possible implementation, p1 and p3 are generated by horizontally interpolating p0 and p2, respectively.

Figure 13:
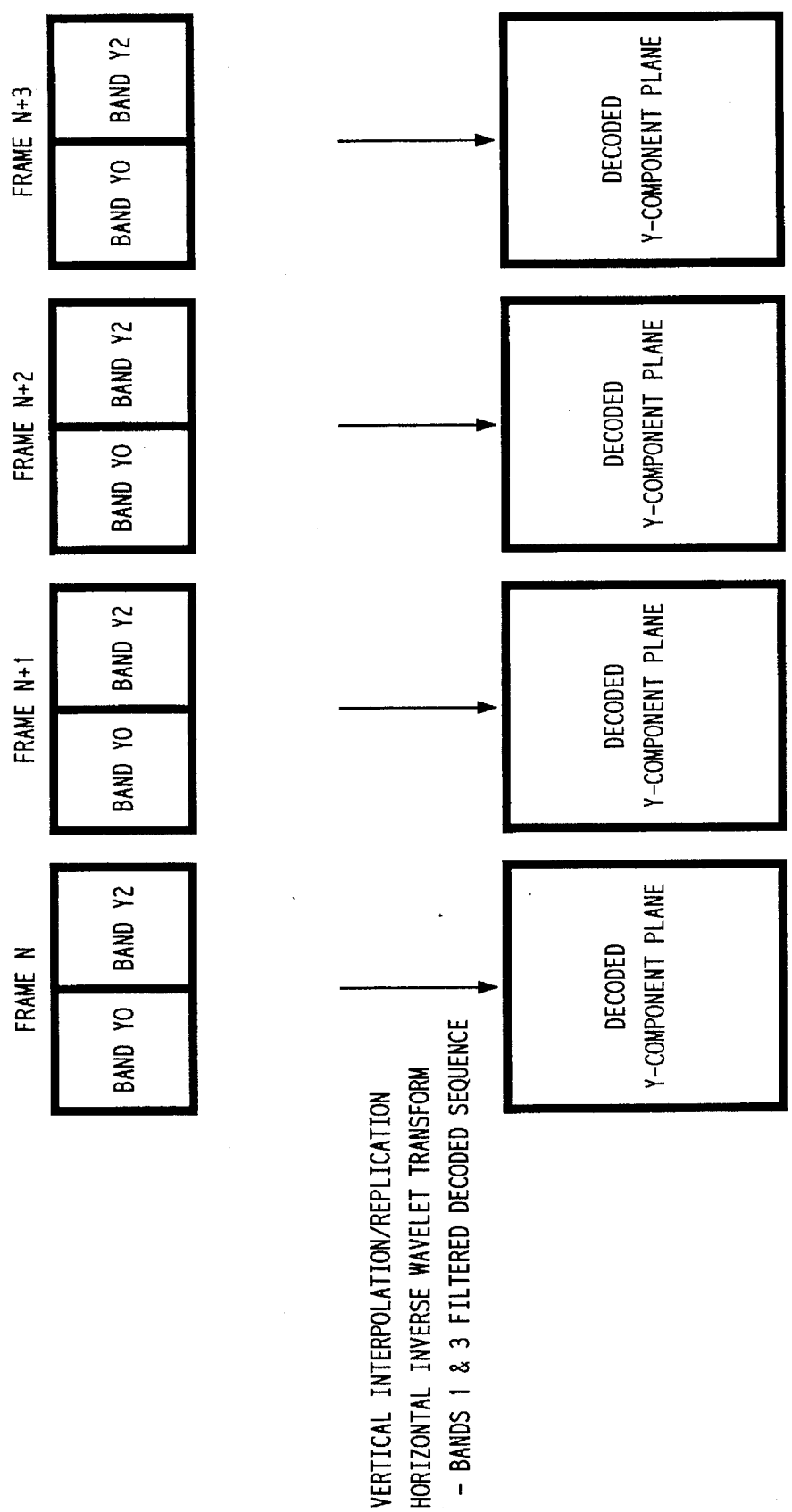

FIG. 13 shows Case 4 in which Bands Y0 and Y2 are decoded (i.e., Bands Y1 and Y3 are dropped). In Case 4, p0 and p1 are generated using the following Equation (4), derived from Equation (2) where b1 and b3 are both zero:

$$p0 = [(b0+b2)+2] >> 2 \quad (4)$$
$$p1 = [(b0-b2)+2] >> 2$$

In one possible implementation of Case 4, p2 and p3 are generated by vertically replicating p0 and p1, respectively. In another possible implementation, p2 and p3 are generated by vertically interpolating p0 and p1, respectively.

Figure 14:
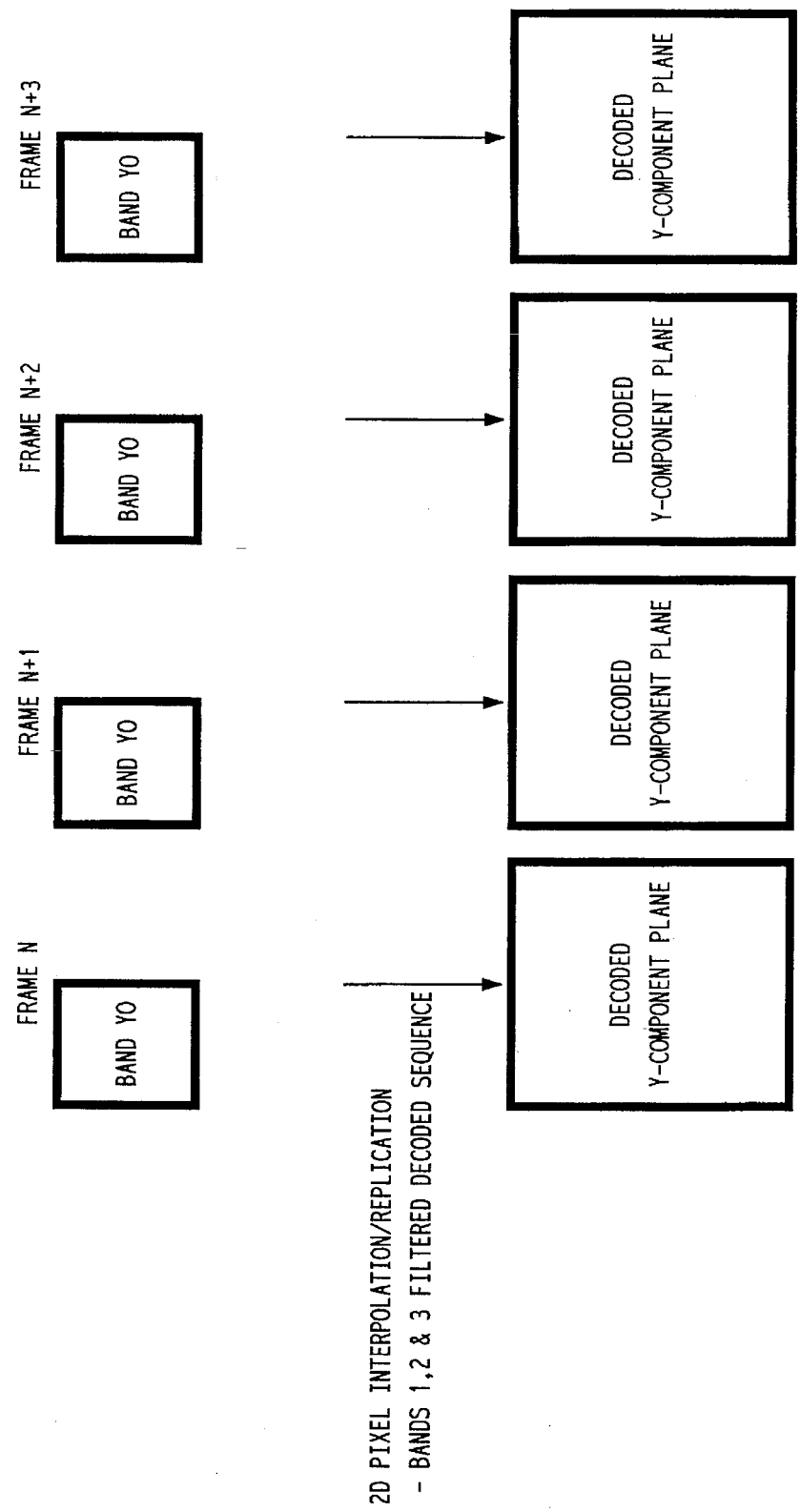

FIG. 14 shows Case 5 in which only Band Y0 is decoded (i.e., Bands Y1, Y2, and Y3 are dropped). In Case 5, two-dimensional interpolation or replication is performed. Alternatively, the Band Y0 data can be used with the subsampled U and V data to display decoded images at a quarter size (Case 6).

In general, Cases 1–6 are arranged in order of decreasing image quality and decreasing processing bandwidth requirement, with Case 1 having the highest image quality, while requiring the greatest processing bandwidth.

Alternative Embodiments

In one embodiment of the present invention, the encode processing of FIG. 5 (including motion estimation) is applied to each of the six bands of each inter-encoded video frame. In another embodiment, the motion estimation of motion estimator 502 is applied only to the Band Y0 data. In this latter embodiment, the motion vectors generated for the Band Y0 data of a frame are used for all six bands of that frame. For example, when encoding Band Y1 data, motion-compensated differencer 504 applies motion compensation on the Band Y1 reference data using the Band Y0 motion vectors to generate the Band Y1 interband differences. In this embodiment, the Band Y0 motion vectors are encoded as part of encoded Band Y0. The decoded Band Y0 motion vectors are then inherited when decoding the other bands.

Those skilled in the art will understand that, compared with the embodiment in which motion estimation is applied to all six bands for each frame, using the Band Y0 motion vectors for all six bands (1) reduces the average encode processing time per frame, (2) reduces the average size of the encoded bitstream per frame, and (3) reduces the average decode processing time per frame. The encode processing time is reduced by removing the need to perform motion estimation on five of the six bands and removing the need to encode five of the six sets of motion vectors. The size of the encoded bitstream is reduced by removing the need to embed five of the six sets of encoded motion vectors into the bitstream. The decode processing time is reduced by removing the need to decode five of the six sets of encoded motion vectors.

Since, under the present invention, each band sequence can be encoded (and decoded) independent of the other band sequences, one or more of the band sequences can be encoded using a different encoding procedure. In general, under the present invention, each band sequence can theoretically be encoded using a different encoding procedure. Using different encoding schemes for different band sequences allows a codec designer to allocate different percentages of the available processing bandwidth to different levels.

For example, a more sophisticated encoding scheme (which requires more decode processing bandwidth) can be used for the most important data (i.e., the Band Y0 data) than that used for some of the less important data (e.g., the Band Y3 data). For example, for high resolution video images, Band Y0 can be encoded using a fairly complex scheme (e.g., motion compensation followed by DCT block transformation followed by run-length and Huffman encoding). At the same time, the Band Y1 and Y2 data can be encoded using a scheme of intermediate complexity (e.g., similar to the complex scheme but with a one-dimensional Haar transform instead of a DCT transform), while the Band Y3 data is encoded using a low-complexity scheme such as vector quantization with no block transformation.

In the embodiment described earlier in this specification in conjunction with FIG. 4, a wavelet transform is applied to the Y-component plane of a YUV9-format video stream and the resulting six bands (Y0, Y1, Y2, Y3, U, and V) are encoded. Those skilled in the art will understand that alternative embodiments fall within the scope of the present invention. For example, the video stream may comprise video signals in data formats other than YUV9, such as, but not limited to, YUV12, YUV16, YUV24, and RGB24.

The preferred transform defined by Equations (1) and (2) is a modified Haar transform. It will be understood that wavelet transforms other than this preferred transform may be used with the present invention, such as a four-coefficient Daubechies transform. In addition, transforms other than wavelet transforms can be used to transform the component planes into multiple bands of data, such as pyramid representations or multiresolution decompositions. Transforms can also be applied to the U- and/or V-component planes to transform each of those planes into two or more bands. Moreover, additional transforms can be applied to one or more of the bands to generate still more bands. For example, a wavelet transform can be applied to Band Y0 to further transform Band Y0 into four bands. Each of these further bands is then encoded as a band sequence independent of all of the other bands. In general, the transforms can differ from component plane to component plane and from band to band.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding video signals, comprising the steps of:

(a) applying a transform to at least one component plane of each frame of a video stream to generate a transformed video stream comprising a plurality of bands for each frame, wherein the transformed video stream comprises a plurality of band sequences, each band sequence comprising corresponding bands of different frames;

(b) encoding each band sequence independent of each other band sequence to generate an encoded bitstream, wherein step (b) comprises the step of interframe encoding at least one of the plurality of band sequences;

(c) dropping at least one encoded band sequence from the encoded bitstream; and (d) transmitting the rest of the encoded band sequences for decoding of the rest of the encoded band sequences independent of each other encoded band sequence to generate a decoded video stream.

2. The process of claim 1, wherein:

each frame comprises a plurality of component planes; and step (a) comprises the step of applying a wavelet transform to at least one component plane of each frame of the video stream to generate at least two bands for the component plane of each frame.

3. The process of claim 1, wherein:

each frame comprises a Y-component plane, a U-component plane, and a V-component plane; and step (a) comprises the step of applying the transform to the Y-component plane of each frame of the video stream to generate the plurality of bands for the Y-component plane of each frame.

4. The process of claim 1, wherein step (b) comprises the steps of:

(1) encoding a first band sequence of the plurality of band sequences using a first video encoding procedure; and (2) encoding a second band sequence of the plurality of band sequences using a second video encoding procedure different from the first video encoding procedure.

5. The process of claim 1, wherein step (b) comprises the steps of:

(1) performing motion estimation on a first band sequence of the plurality of band sequences to generate a first set of motion vectors for the first band sequence;

(2) interframe encoding the first band sequence using motion compensation based on the first set of motion vectors; and (3) interframe encoding a second band sequence of the plurality of band sequences using motion compensation based on the first set of motion vectors.

6. The process of claim 1, wherein:

each frame comprises a Y-component plane, a subsampled U-component plane, and a subsampled V-component plane;

step (a) comprises the step of applying a wavelet transform to the Y-component plane of each frame of the video stream to generate a wavelet-transformed video stream comprising four bands for the Y-component plane of each frame, wherein the wavelet-transformed video stream comprises a first Y-component band sequence, a second Y-component band sequence, a third Y-component band sequence, a fourth Y-component band sequence, a U-component band sequence, and a V-component band sequence; and step (b) comprises the steps of:

(1) performing motion estimation on the first Y-component band sequence to generate a first set of motion vectors for the first Y-component band sequence;

(2) interframe encoding the first Y-component band sequence using motion compensation based on the first set of motion vectors; and (3) interframe encoding a second band sequence of the plurality of band sequences using motion compensation based on the first set of motion vectors.

7. The process of claim 6, wherein:

step (b)(2) comprises the step of encoding the first Y-component band sequence using a first video encoding procedure; and step (b) further comprises the step of encoding at least one of the other band sequences using a second video encoding procedure different from the first video encoding procedure.

8. A storage medium encoded with machine-readable program code for encoding video signals, comprising:

(a) means for causing a machine to apply a transform to at least one component plane of each frame of a video stream to generate a transformed video stream comprising a plurality of bands for each frame, wherein the transformed video stream comprises a plurality of band sequences, each band sequence comprising corresponding bands of different frames;

(b) means for causing the machine to encode each band sequence independent of each other band sequence to generate an encoded bitstream, wherein means (b) causes the machine to perform interframe encoding on at least one of the plurality of band sequences;

(c) means for causing the machine to drop at least one encoded band sequence from the encoded bitstream; and (d) means for causing the machine to transmit the rest of the encoded band sequences for decoding of the rest of the encoded band sequences independent of each other encoded band sequence to generate a decoded video stream.

9. The storage medium of claim 8, wherein:

each frame comprises a plurality of component planes; and means (a) causes the machine to apply a wavelet transform to at least one component plane of each frame of the video stream to generate at least two bands for the component plane of each frame.

10. The storage medium of claim 8, wherein:

each frame comprises a Y-component plane, a U-component plane, and a V-component plane; and means (a) causes the machine to apply the transform to the Y-component plane of each frame of the video stream to generate the plurality of bands for the Y-component plane of each frame.

11. The storage medium of claim 8, wherein means (b) causes the machine to:

(1) encode a first band sequence of the plurality of band sequences using a first video encoding procedure; and (2) encode a second band sequence of the plurality of band sequences using a second video encoding procedure different from the first video encoding procedure.

12. The storage medium of claim 8, wherein means (b) causes the machine to:

(1) perform motion estimation on a first band sequence of the plurality of band sequences to generate a first set of motion vectors for the first band sequence;

(2) perform interframe encoding on the first band sequence using motion compensation based on the first set of motion vectors; and (3) perform interframe encoding on a second band sequence of the plurality of band sequences using motion compensation based on the first set of motion vectors.

13. The storage medium of claim 8, wherein:

each frame comprises a Y-component plane, a subsampled U-component plane, and a subsampled V-component plane;

means (a) causes the machine to apply a wavelet transform to the Y-component plane of each frame of the video stream to generate a wavelet-transformed video stream comprising four bands for the Y-component plane of each frame, wherein the wavelet-transformed video stream comprises a first Y-component band sequence, a second Y-component band sequence, a third Y-component band sequence, a fourth Y-component band sequence, a U-component band sequence, and a V-component band sequence; and means (b) causes the machine to:

(1) perform motion estimation on the first Y-component band sequence to generate a first set of motion vectors for the first Y-component band sequence;

(2) perform interframe encoding on the first Y-component band sequence using motion compensation based on the first set of motion vectors; and (3) perform interframe encoding on a second band sequence of the plurality of band sequences using motion compensation based on the first set of motion vectors.

14. The storage medium of claim 13, wherein:

means (b) causes the machine to encode the first Y-component band sequence using a first video encoding procedure; and means (b) causes the machine to encode at least one of the other band sequences using a second video encoding procedure different from the first video encoding procedure.

15. An apparatus for encoding video signals, comprising:

(a) a forward transform;

(b) at least one coder; and (c) a transmitter, wherein:

the forward transform applies a transform to at least one component plane of each frame of a video stream to generate a transformed video stream comprising a plurality of bands for each frame, wherein the transformed video stream comprises a plurality of band sequences, each band sequence comprising corresponding bands of different frames;

the at least one coder encodes each band sequence independent of each other band sequence to generate an encoded bitstream, wherein the at least one coder performs interframe encoding on at least one of the plurality of band sequences;

the transmitter drops at least one encoded band sequence from the encoded bitstream; and the transmitter transmits the rest of the encoded band sequences for decoding of the rest of the encoded band sequences independent of each other encoded band sequence to generate a decoded video stream.

16. The apparatus of claim 15, wherein:

each frame comprises a plurality of component planes; and the forward transform applies a wavelet transform to at least one component plane of each frame of the video stream to generate at least two bands for the component plane of each frame.

17. The apparatus of claim 15, wherein:

each frame comprises a Y-component plane, a U-component plane, and a V-component plane; and the forward transform applies the transform to the Y-component plane of each frame of the video stream to generate the plurality of bands for the Y-component plane of each frame.

18. The apparatus of claim 15, wherein the at least one coder:

(1) encodes a first band sequence of the plurality of band sequences using a first video encoding procedure; and (2) encodes a second band sequence of the plurality of band sequences using a second video encoding procedure different from the first video encoding procedure.

19. The apparatus of claim 15, wherein the at least one coder:

(1) performs motion estimation on a first band sequence of the plurality of band sequences to generate a first set of motion vectors for the first band sequence;

(2) performs interframe encoding on the first band sequence using motion compensation based on the first set of motion vectors; and (3) performs interframe encoding on a second band sequence of the plurality of band sequences using motion compensation based On the first set of motion vectors.

20. The apparatus of claim 15, wherein:

each frame comprises a Y-component plane, a subsampled U-component plane, and a subsampled V-component plane;

the forward transform applies a wavelet transform to the Y-component plane of each frame of the video stream to generate a wavelet-transformed video stream comprising four bands for the Y-component plane of each frame, wherein the wavelet-transformed video stream comprises a first Y-component band sequence, a second Y-component band sequence, a third Y-component band sequence, a fourth Y-component band sequence, a U-component band sequence, and a V-component band sequence; and the at least one coder:

(1) performs motion estimation on the first Y-component band sequence to generate a first set of motion vectors for the first Y-component band sequence;

(2) performs interframe encoding on the first Y-component band sequence using motion compensation based on the first set of motion vectors; and (3) performs interframe encoding on a second band sequence of the plurality of band sequences using motion compensation based on the first set of motion vectors.

21. The apparatus of claim 20, wherein:

the at least one coder encodes the first Y-component band sequence using a first video encoding procedure; and the at least one coder encodes at least one of the other band sequences using a second video encoding procedure different from the first video encoding procedure.

22. A computer-implemented process for decoding encoded video signals, comprising the steps of:

(a) parsing an encoded bitstream into a plurality of encoded band sequences, wherein each encoded band sequence has been generated by encoding each band sequence of a plurality of band sequences of a transformed video stream, the transformed video stream having been generated by applying a transform to at least one component plane of each frame of an original video stream to generate a plurality of bands for each frame; and (b) decoding each encoded band sequence independent of each other encoded band sequence to generate a decoded video stream, wherein step (b) comprises the step of interframe decoding at least one of the plurality of encoded band sequences, wherein:

step (a) comprises the step of dropping at least one of the encoded band sequences; and step (b) comprises the step of decoding the rest of the encoded band sequences independent of each other encoded band sequence to generate the decoded video stream.

23. The process of claim 22, wherein:

each frame of the original video stream comprised a plurality of component planes; and the transformed video stream was generated by applying a wavelet transform to at least one component pirate of each frame of the original video stream to generate at least two bands for the component plane of each frame.

24. The process of claim 22, wherein:

each frame of the original video stream comprised a Y-component plane, a U-component plane, and a V-component plane; and the transformed video stream was generated by applying the transform to the Y-component plane of each frame of the video stream to generate the plurality of bands for the Y-component plane of each frame.

25. The process of claim 22, wherein step (b) comprises the steps of:

(1) decoding an encoded first band sequence of the plurality of encoded band sequences using a first video decoding procedure; and (2) decoding an encoded second band sequence of the plurality of band sequences using a second video decoding procedure different from the first video decoding procedure.

26. The process of claim 22, wherein:

the encoded bitstream further comprises a first set of motion vectors, the first set of motion vectors having been generated by performing motion estimation on a first band sequence of the plurality of band sequences of the transformed video stream;

step (b) comprises the step of interframe decoding an encoded first band sequence of the plurality of encoded band sequences using motion compensation based on the first set of motion vectors; and step (b) further comprises the step of interframe decoding an encoded second band sequence of the plurality of encoded band sequences using motion compensation based on the first set of motion vectors.

27. The process of claim 22, wherein step (b) comprises the step of applying an inverse transform to two or more decoded bands to generate a decoded component plane.

28. The process of claim 22, wherein step (a) comprises the step of dropping at least one of the encoded band sequences based on at least one of transmission bandwidth considerations and decode processing considerations.

29. The process of claim 22, wherein:

each frame of the original video stream comprised a Y-component plane, a subsampled U-component plane, and a subsampled V-component plane;

the transformed video stream was generated by applying a wavelet transform to the Y-component plane of each frame of the original video stream to generate four bands for the Y-component plane of each frame, wherein the transformed video stream comprised a first Y-component band sequence, a second Y-component band sequence, a third Y-component band sequence, a fourth Y-component band sequence, a U-component band sequence, and a V-component band sequence;

the encoded bitstream comprises an encoded first Y-component band sequence, an encoded second Y-component band sequence, an encoded third Y-component band sequence, an encoded fourth Y-component band sequence, an encoded U-component band sequence, and an encoded V-component band sequence;

the encoded bitstream further comprises a first set of motion vectors, the first set of motion vectors having been generated by performing motion estimation on the first Y-component band sequence;

step (b) comprises the step of interframe decoding the encoded first Y-component band sequence using motion compensation based on the first set of motion vectors;

step (b) comprises the step of applying an inverse wavelet transform to two or more decoded Y-component bands to generate a decoded Y-component plane; and step (b) further comprises the step of interframe decoding each of the other encoded band sequences using motion compensation based on the first set of motion vectors.

30. The process of claim 29, wherein step (b) comprises the steps of:

(1) decoding the encoded first Y-component band sequence using a first video decoding procedure; and (2) decoding at least one of the other encoded band sequences using a second video decoding procedure different from the first video decoding procedure.

31. A storage medium encoded with machine-readable program code for decoding encoded video signals, comprising:

(a) means for causing a machine to parse an encoded bitstream into a plurality of encoded band sequences, wherein each encoded band sequence has been generated by encoding each band sequence of a plurality of band sequences of a transformed video stream, the transformed video stream having been generated by applying a transform to at least one component plane of each frame of an original video stream to generate a plurality of bands for each frame; and (b) means for causing the machine to decode each encoded band sequence independent of each other encoded band sequence to generate a decoded video stream, wherein means (b) causes the machine to perform interframe decoding on at least one of the plurality of encoded band sequences, wherein:

step (a) causes the machine to drop at least one of the encoded band sequences; and step (b) causes the machine to decode the rest of the encoded band sequences independent of each other encoded band sequence to generate the decoded video stream.

32. The storage medium of claim 31, wherein:

each frame of the original video stream comprised a plurality of component planes; and the transformed video stream was generated by applying a wavelet transform to at least one component plane of each frame of the original video stream to generate at least two bands for the component plane of each frame.

33. The storage medium of claim 31, wherein:

each frame of the original video stream comprised a Y-component plane, a U-component plane, and a V-component plane; and the transformed video stream was generated by applying the transform to the Y-component plane of each frame of the video stream to generate the plurality of bands for the Y-component plane of each frame.

34. The storage medium of claim 31, wherein means (b) causes the machine to:

(1) decode an encoded first band sequence of the plurality of encoded band sequences using a first video decoding procedure; and (2) decode an encoded second band sequence of the plurality of band sequences using a second video decoding procedure different from the first video decoding procedure.

35. The storage medium of claim 31, wherein:

the encoded bitstream further comprises a first set of motion vectors, the first set of motion vectors having been generated by performing motion estimation on a first band sequence of the plurality of band sequences of the transformed video stream;

means (b) causes the machine to perform interframe decoding on an encoded first band sequence of the plurality of encoded band sequences using motion compensation based on the first set of motion vectors; and means (b) causes the machine to perform interframe decoding on an encoded second band sequence of the plurality of encoded band sequences using motion compensation based on the first set of motion vectors.

36. The storage medium of claim 31, wherein means (b) causes the machine to apply an inverse transform to two or more decoded bands to generate a decoded component plane.

37. The storage medium of claim 31, wherein means (a) causes the machine to drop at least one of the encoded band sequences based on at least one of transmission bandwidth considerations and decode processing considerations.

38. The storage medium of claim 31, wherein:

each frame of the original video stream comprised a Y-component plane, a subsampled U-component plane, and a subsampled V-component plane;

the transformed video stream was generated by applying a wavelet transform to the Y-component plane of each frame of the original video stream to generate four bands for the Y-component plane of each frame, wherein the transformed video stream comprised a first Y-component band sequence, a second Y-component band sequence, a third Y-component band sequence, a fourth Y-component band sequence, a U-component band sequence, and a V-component band sequence;

the encoded bitstream comprises an encoded first Y-component band sequence, an encoded second Y-component band sequence, an encoded third Y-component band sequence, an encoded fourth Y-component band sequence, an encoded U-component band sequence, and an encoded V-component band sequence;

the encoded bitstream further comprises a first set of motion vectors, the first set of motion vectors having been generated by performing motion estimation on the first Y-component band sequence;

means (b) causes the machine to perform interframe decoding on the encoded first Y-component band sequence using motion compensation based on the first set of motion vectors;

means (b) causes the machine to apply an inverse wavelet transform to two or more decoded Y-component bands to generate a decoded Y-component plane; and means (b) causes the machine to perform interframe decoding on each of the other encoded band sequences using motion compensation based on the first set of motion vectors.

39. The storage medium of claim 38, wherein means (b) causes the machine to:

(1) decode the encoded first Y-component band sequence using a first video decoding procedure; and (2) decode at least one of the other encoded band sequences using a second video decoding procedure different from the first video decoding procedure.

40. An apparatus for decoding encoded video signals, comprising:

(a) a bitstream parser; and (b) at least one decoder, wherein:

the bitstream parser parses an encoded bitstream into a plurality of encoded band sequences, wherein each encoded band sequence has been generated by encoding each band sequence of a plurality of band sequences of a transformed video stream, the transformed video stream having been generated by applying a transform to at least one component plane of each frame of an original video stream to generate a plurality of bands for each frame;

the at least one decoder decodes each encoded band sequence independent of each other encoded band sequence to generate a decoded video stream, wherein the at least one decoder performs interframe decoding on at least one of the plurality of encoded band sequences;

the bitstream parser drops at least one of the encoded band sequences: and the at least one decoder decodes the rest of the encoded band sequences independent of each other encoded band sequence to generate the decoded video stream.

41. The apparatus of claim 40, wherein:

each frame of the original video stream comprised a plurality of component planes; and the transformed video stream was generated by applying a wavelet transform to at least one component plane of each frame of the original video stream to generate at least two bands for the component plane of each frame.

42. The apparatus of claim 40, wherein:

each frame of the original video stream comprised a Y-component plane, a U-component plane, and a V-component plane; and the transformed video stream was generated by applying the transform to the Y-component plane of each frame of the video stream to generate the plurality of bands for the Y-component plane of each frame.

43. The apparatus of claim 40, wherein the at least one decoder:

(1) decodes an encoded first band sequence of the plurality of encoded band sequences using a first video decoding procedure; and (2) decodes an encoded second band sequence of the plurality of band sequences using a second video decoding procedure different from the first video decoding procedure.

44. The apparatus of claim 40, wherein:

the encoded bitstream further comprises a first set of motion vectors, the first set of motion vectors having been generated by performing motion estimation on a first band sequence of the plurality of band sequences of the transformed video stream;

the at least one decoder performs interframe decoding on an encoded first band sequence of the plurality of encoded band sequences using motion compensation based on the first set of motion vectors; and the at least one decoder performs interframe decoding on an encoded second band sequence of the plurality of encoded band sequences using motion compensation based on the first set of motion vectors.

45. The apparatus of claim 40, further comprising an inverse transform for applying an inverse transform to two or more decoded bands to generate a decoded component plane.

46. The apparatus of claim 40, wherein the bitstream parser drops at least one of the encoded band sequences based on at least one of transmission bandwidth considerations and decode processing considerations.

47. The apparatus of claim 40, wherein:

each frame of the original video stream comprised a Y-component plane, a subsampled U-component plane, and a subsampled V-component plane;

the transformed video stream was generated by applying a wavelet transform to the Y-component plane of each frame of the original video stream to generate four bands for the Y-component plane of each frame, wherein the transformed video stream comprised a first Y-component band sequence, a second Y-component band sequence, a third Y-component band sequence, a fourth Y-component band sequence, a U-component band sequence, and a V-component band sequence;

the encoded bitstream comprises an encoded first Y-component band sequence, an encoded second Y-component band sequence, an encoded third Y-component band sequence, an encoded fourth Y-component band sequence, an encoded U-component band sequence, and an encoded V-component band sequence;

the encoded bitstream further comprises a first set of motion vectors, the first set of motion vectors having been generated by performing motion estimation on the first Y-component band sequence;

the at least one decoder performs interframe decoding on the encoded first Y-component band sequence using motion compensation based on the first set of motion vectors;

the at least one decoder performs interframe decoding on each of the other encoded band sequences using motion compensation based on the first set of motion vectors; and further comprising an inverse wavelet transform for applying an inverse wavelet transform to two or more decoded Y-component bands to generate a decoded Y-component plane.

48. The apparatus of claim 47, wherein the at least one decoder:

(1) decodes the encoded first Y-component band sequence using a first video decoding procedure; and (2) decodes at least one of the other encoded band sequences using a second video decoding procedure different from the first video decoding procedure.

49. The process of claim 1, wherein step (c) comprises the step of dropping the at least one encoded band sequence based on at least one of transmission bandwidth considerations and decode processing considerations.

50. The storage medium of claim 8, wherein step (c) comprises the step of dropping the at least one encoded band sequence based on at least one of transmission bandwidth considerations and decode processing considerations.

51. The apparatus of claim 15, wherein the at least one coder drops the at least one encoded band sequence based on at least one of transmission bandwidth considerations and decode processing considerations.

52. The process of claim 27, wherein step (b) comprises the step of applying a version of the inverse transform to the decoded bands corresponding to less than all of the bands generated when the transform was applied to the at least one component plane.

53. The storage medium of claim 36, wherein step (b) comprises the step of applying a version of the inverse transform to the decoded bands corresponding to less than all of the bands generated when the transform was applied to the at least one component plane.

54. The process of claim 45, wherein the inverse transform applies a version of the inverse transform to the decoded bands corresponding to less than all of the bands generated when the transform was applied to the at least one component plane.

55. A computer-implemented process for encoding video signals, comprising the steps of:
  (a) applying a transform to at least one component plane of each frame of a video stream to generate a transformed video stream comprising a plurality of bands for each frame, wherein the transformed video stream comprises a plurality of band sequences, each band sequence comprising corresponding bands of different frames; and
  (b) encoding each band sequence independent of each other band sequence to generate an encoded bitstream, wherein:
  step (b) comprises the step of interframe encoding at least one of the plurality of band sequences;
  each frame comprises a Y-component plane, a U-component plane, and a V-component plane; and
  step (a) comprises the step of applying the transform to the Y-component plane of each frame of the video stream to generate the plurality of bands for the Y-component plane of each frame.

56. A computer-implemented process for decoding encoded video signals, comprising the steps of:
  (a) parsing an encoded bitstream into a plurality of encoded band sequences, wherein each encoded band sequence has been generated by encoding each band sequence of a plurality of band sequences of a transformed video stream, the transformed video stream having been generated by applying a transform to at least one component plane of each frame of an original video stream to generate a plurality of bands for each frame; and
  (b) decoding each encoded band sequence independent of each other encoded band sequence to generate a decoded video stream, wherein:
  step (b) comprises the step of interframe decoding at least one of the plurality of encoded band sequences;
  each frame of the original video stream comprised a Y-component plane, a U-component plane, and a V-component plane; and
  the transformed video stream was generated by applying the transform to the Y-component plane of each frame of the video stream to generate the plurality of bands for the Y-component plane of each frame.

57. A computer-implemented process for encoding video signals, comprising the steps of:
  (a) applying a transform to at least one component plane of each frame of a video stream to generate a transformed video stream comprising a plurality of bands for each frame, wherein the transformed video stream comprises a plurality of band sequences, each band sequence comprising corresponding bands of different frames; and
  (b) encoding each band sequence independent of each other band sequence to generate an encoded bitstream, wherein step (b) comprises the steps of:
    (1) performing motion estimation on a first band sequence of the plurality of band sequences to generate a first set of motion vectors for the first band sequence;
    (2) interframe encoding the first band sequence using motion compensation based on the first set of motion vectors; and
    (3) interframe encoding a second band sequence of the plurality of band sequences using motion compensation based on the first set of motion vectors.

58. The process of claim 57, wherein the first and second band sequences are two of the band sequences generated by applying the transform to the at least one component plane of each frame.

59. A computer-implemented process for decoding encoded video signals, comprising the steps of:
  (a) parsing an encoded bitstream into a plurality of encoded band sequences, wherein each encoded band sequence has been generated by encoding each band sequence of a plurality of band sequences of a transformed video stream, the transformed video stream having been generated by applying a transform to at least one component plane of each frame of an original video stream to generate a plurality of bands for each frame; and
  (b) decoding each encoded band sequence independent of each other encoded band sequence to generate a decoded video stream, wherein:
  the encoded bitstream further comprises a first set of motion vectors, the first set of motion vectors having been generated by performing motion estimation on a first band sequence of the plurality of band sequences of the transformed video stream;
  step (b) comprises the steps of:
    (1) interframe decoding an encoded first band sequence of the plurality of encoded band sequences using motion compensation based on the first set of motion vectors; and
    (2) interframe decoding an encoded second band sequence of the plurality of encoded band sequences using motion compensation based on the first set of motion vectors.

60. The process of claim 59, wherein the first and second band sequences are two of the band sequences generated by applying the transform to the at least one component plane of each frame.

61. A computer-implemented process for encoding video signals, comprising the steps of:
  (a) applying a transform to at least one component plane of each frame of a video stream to generate a transformed video stream comprising a plurality of bands for each frame, wherein the transformed video stream comprises a plurality of band sequences, each band sequence comprising corresponding bands of different frames; and
  (b) encoding each band sequence independent of each other band sequence to generate an encoded bitstream, wherein:
  step (b) comprises the step of interframe encoding at least one of the plurality of band sequences;
  each frame comprises a plurality of component planes; and
  step (a) comprises the step of applying a wavelet transform to at least one component plane of each frame of the video stream to generate at least two bands for the component plane of each frame.

62. The process of claim 61, wherein step (a) comprises the step of applying the wavelet transform to each (2×2) block of the at least one component plane to generate a transformed component for each of four bands.

63. The process of claim 61 wherein at least one of the wavelet transform and an inverse wavelet transform corresponding to the wavelet transform is a non-orthonormal transformation.

64. A computer-implemented process for decoding encoded video signals, comprising the steps of:

(a) parsing an encoded bitstream into a plurality of encoded band sequences, wherein each encoded band sequence has been generated by encoding each band sequence of a plurality of band sequences of a transformed video stream, the transformed video stream having been generated by applying a transform to at least one component plane of each frame of an original video stream to generate a plurality of bands for each frame; and (b) decoding each encoded band sequence independent of each other encoded band sequence to generate a decoded video stream, wherein:

step (b) comprises the step of interframe decoding at least one of the plurality of encoded band sequences;

each frame of the original video stream comprised a plurality of component planes; and the transformed video stream was generated by applying a wavelet transform to at least one component plane of each frame of the original video stream to generate at least two bands for the component plane of each frame.

65. The process of claim 64, wherein step (a) comprises the step of applying the wavelet transform to each (2×2) block of the at least one component plane to generate a transformed component for each of four bands.

66. The process of claim 64 wherein at least one of the wavelet transform and an inverse wavelet transform corresponding to the wavelet transform is a non-orthonormal transformation.

\* \* \* \* \*

UNITED STATES PATENT AND TRADEMARK OFFICE
CERTIFICATE OF CORRECTION

PATENT NO. : 5,585,852

DATED : December 17, 1996

INVENTOR(S) : Rohit Agarwal

Page 1 of 2

It is certified that error appears in the above-indentified patent and that said Letters Patent is hereby corrected as shown below:

Title Page [56] References Cited, U.S. PATENT DOCUMENTS, add:

| | | |
|---|---|---|
| 5,371,611 | 12/94 | Kato et al. |
| 5,333,212 | 7/94 | Ligtenberg |
| 5,341,318 | 8/94 | Balkanski et al. |
| 5,224,062 | 6/93 | McMillan, Jr. et al. |
| 4,698,689 | 10/87 | Tzou |

Title Page [56] OTHER PUBLICATIONS, add:

Practical Fast 1-D DCT Algorithms with 11 Multiplications, by Christoph Loeffler, Adriaan Ligtenberg, and George S. Moschytz, 1989 IEEE; pp. 988-991.

IEEE Standard Specifications for the Implementations of 8x8 Inverse Discrete Cosine Transform, IEEE Std. 1/80-1990, 7/16/92; 14 pages.

Prioritized DCT for Compression and Progressive Transmission of Images, by Yunming Huang, Howard M. Dreizen, and Nikolas P. Galatsanos, Members, IEEE, published by IEEE Transactions on Image Processing, Vol. 1 No. 4, dated October 1992; p. 477-487.

Discrete Cosine Transform Algorithms, Advantages, Applications, by K.R. Rao and P. Yip, published by Academic Press, Inc., dated 1990; 33 pages.

Wavelets and Image Compression by John C. Huffman, SMPTE Journal, November 1994, pp. 723-727.

UNITED STATES PATENT AND TRADEMARK OFFICE
CERTIFICATE OF CORRECTION

PATENT NO. : 5,585,852

DATED : December 17, 1996

INVENTOR(S) : Rohit Agarwal

It is certified that error appears in the above-indentified patent and that said Letters Patent is hereby corrected as shown below:

Title Page [56] OTHER PUBLICATIONS, add:

Shapiro, Jerome M., "An Embedded Hierarchical Image Coder Using Zerotrees of Wavelet Coefficients." The David Sarnoff Research Center, a Subsidiary of SRI International, Princeton, N.J. 08543-5300. To appear in Proc. Data Compression Conference, Snowbird, UT, 1993.

DeVore, Ronald A., et al., "Image Compression Through Wavelet Transform Coding." IEEE Transactions on Information Theory, Vol. 38, No. 2, March 1992.

Shapiro, Jerome M., "An Embedded Wavelet Hierarchical Image Coder." The David Sarnoff Research Center, a Subsidiary of SRI International, Princeton, NJ 08543-5300. Proc. Int. Conf. On Acoustics, Speech, and Signal Processing (ICASSP), San Francisco, CA, March 23-26, 1992, Vol IV, pp. 657-660.

Column 18, line 5, delete "pirate" and insert therefor --plane--.

Signed and Sealed this

Nineteenth Day of August, 1997

*Attest:*

BRUCE LEHMAN

*Attesting Officer*   Commissioner of Patents and Trademarks